United States Patent
Mizuno

(10) Patent No.: US 10,397,424 B2
(45) Date of Patent: Aug. 27, 2019

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Yoshitake Mizuno, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/938,052

(22) Filed: Mar. 28, 2018

(65) Prior Publication Data

US 2018/0288259 A1 Oct. 4, 2018

(30) Foreign Application Priority Data

Mar. 30, 2017 (JP) ................................. 2017-068812

(51) Int. Cl.
*H04N 1/00* (2006.01)

(52) U.S. Cl.
CPC ..... *H04N 1/00809* (2013.01); *H04N 1/00045* (2013.01); *H04N 1/00702* (2013.01); *H04N 1/00734* (2013.01); *H04N 1/00761* (2013.01); *H04N 1/00785* (2013.01)

(58) Field of Classification Search
CPC ........... H04N 1/00761; H04N 1/00734; H04N 1/00045; H04N 1/00809; G06K 9/3208; G06K 9/3216; G06K 2009/3225
See application file for complete search history.

(56) References Cited

U.S. PATENT DOCUMENTS

| 7,760,370 B2* | 7/2010 | Oki ...................... H04N 1/0058 358/1.1 |
| 2014/0233071 A1* | 8/2014 | Kido .................. H04N 1/00013 358/3.26 |
| 2016/0241730 A1* | 8/2016 | Mizuno .............. H04N 1/00702 |
| 2016/0277610 A1* | 9/2016 | Kishi ................. H04N 1/00705 |
| 2017/0052468 A1* | 2/2017 | Omura .............. G03G 15/0131 |
| 2017/0104887 A1* | 4/2017 | Nomura ............. H04N 1/00355 |
| 2017/0104888 A1* | 4/2017 | Nomura ............... H04N 1/3878 |
| 2017/0109617 A1* | 4/2017 | Narimatu ............... G03G 15/16 |

FOREIGN PATENT DOCUMENTS

JP 2003173109 A 6/2003

* cited by examiner

*Primary Examiner* — Nicholas Pachol
(74) *Attorney, Agent, or Firm* — Rossi, Kimms & McDowell LLP

(57) ABSTRACT

An image forming apparatus comprises a printer for forming an image on a sheet, an image scanner for reading a measurement image formed on a sheet, and a controller. The printer forms the measurement image at four corners of the sheet. The image scanner reads the sheet on which the measurement image is formed by dividing into two parts. The controller generates an entire read image of the sheet from the read image of the measurement image which is read by the image scanner by dividing into two parts. The controller generates an adjustment condition to adjust a position of an image formed by the printer based on the entire read image of the sheet. The controller causes the printer to form the image based on the adjustment condition.

11 Claims, 15 Drawing Sheets

| | 511 | 512 | 513 | 514 | 515 | 516 | 517 | 518 | 519 |
|---|---|---|---|---|---|---|---|---|---|
| | SHEET NAME | WIDTH (mm) | LENGTH (mm) | BASIS WEIGHT (g/m^2) | SURFACE PROPERTY | COLOR | PREPRINTED PAPER | POSITION REGISTRATION AMOUNT (FRONT SURFACE) | POSITION REGISTRATION AMOUNT (BACK SURFACE) |
| | ABC PAPER MANUFACTURING RECYCLE 1 | 210 | 297 | 75 | PLAIN PAPER | WHITE | No | LEAD POSITION: 0.30mm<br>SIDE POSITION: -0.1mm<br>MAIN SCANNING MAGNIFICATION: +0.02%<br>SUB-SCANNING MAGNIFICATION: +0.01% | LEAD POSITION: 0.20mm<br>SIDE POSITION: 0.10mm<br>MAIN SCANNING MAGNIFICATION: +0.02%<br>SUB-SCANNING MAGNIFICATION: -0.03% |
| | ABC PAPER MANUFACTURING RECYCLE 2 | 297 | 420 | 75 | PLAIN PAPER | WHITE | No | LEAD POSITION: 0.00mm<br>SIDE POSITION: 0.00mm<br>MAIN SCANNING MAGNIFICATION: +0.00%<br>SUB-SCANNING MAGNIFICATION: +0.00% | LEAD POSITION: 0.00mm<br>SIDE POSITION: 0.00mm<br>MAIN SCANNING MAGNIFICATION: +0.00%<br>SUB-SCANNING MAGNIFICATION: +0.00% |
| | DEF PAPER MANUFACTURING EMBOSSED PAPER A-1 | 216 | 279 | 170 | EMBOSSED | WHITE | No | LEAD POSITION: 0.50mm<br>SIDE POSITION: -0.50mm<br>MAIN SCANNING MAGNIFICATION: +0.02%<br>SUB-SCANNING MAGNIFICATION: +0.02% | LEAD POSITION: -0.30mm<br>SIDE POSITION: 0.50mm<br>MAIN SCANNING MAGNIFICATION: +0.01%<br>SUB-SCANNING MAGNIFICATION: -0.03% |
| | DEF PAPER MANUFACTURING COATED PAPER P-1 | 279 | 432 | 128 | DOUBLE-SIDE COATED | WHITE | No | LEAD POSITION: 0.40mm<br>SIDE POSITION: -0.20mm<br>MAIN SCANNING MAGNIFICATION: +0.12%<br>SUB-SCANNING MAGNIFICATION: +0.08% | LEAD POSITION: -0.20mm<br>SIDE POSITION: 0.60mm<br>MAIN SCANNING MAGNIFICATION: -0.02%<br>SUB-SCANNING MAGNIFICATION: -0.01% |
| | XYZ PAPER MANUFACTURING COLOR 81 | 210 | 297 | 75 | PLAIN PAPER | ORANGE | No | LEAD POSITION: 0.00mm<br>SIDE POSITION: 0.00mm<br>MAIN SCANNING MAGNIFICATION: +0.00%<br>SUB-SCANNING MAGNIFICATION: +0.00% | LEAD POSITION: 0.00mm<br>SIDE POSITION: 0.00mm<br>MAIN SCANNING MAGNIFICATION: +0.00%<br>SUB-SCANNING MAGNIFICATION: +0.00% |
| | XYZ PAPER MANUFACTURING COLOR 82 | 210 | 297 | 75 | PLAIN PAPER | PINK | No | LEAD POSITION: 0.00mm<br>SIDE POSITION: 0.00mm<br>MAIN SCANNING MAGNIFICATION: +0.00%<br>SUB-SCANNING MAGNIFICATION: +0.00% | LEAD POSITION: 0.00mm<br>SIDE POSITION: 0.00mm<br>MAIN SCANNING MAGNIFICATION: +0.00%<br>SUB-SCANNING MAGNIFICATION: +0.00% |
| | FGH PAPER MANUFACTURING GRID 75 | 210 | 297 | 75 | PLAIN PAPER | WHITE | Yes | LEAD POSITION: 0.00mm<br>SIDE POSITION: 0.00mm<br>MAIN SCANNING MAGNIFICATION: +0.00%<br>SUB-SCANNING MAGNIFICATION: +0.00% | LEAD POSITION: 0.00mm<br>SIDE POSITION: 0.00mm<br>MAIN SCANNING MAGNIFICATION: +0.00%<br>SUB-SCANNING MAGNIFICATION: +0.00% |
| | FGH PAPER MANUFACTURING PLAIN PAPER 2 | 210 | 297 | 75 | PLAIN PAPER | WHITE | No | LEAD POSITION: -0.03mm<br>SIDE POSITION: -0.07mm<br>MAIN SCANNING MAGNIFICATION: +0.06%<br>SUB-SCANNING MAGNIFICATION: -0.01% | LEAD POSITION: -0.03mm<br>SIDE POSITION: -0.10mm<br>MAIN SCANNING MAGNIFICATION: +0.04%<br>SUB-SCANNING MAGNIFICATION: +0.02% |

| | MEASURED VALUE | IDEAL VALUE | POSITION REGISTRATION AMOUNT |
|---|---|---|---|
| LEAD POSITION (FRONT SURFACE) | (D+H)/2 | 10.0 mm | MEASURED VALUE −IDEAL VALUE |
| SIDE POSITION (FRONT SURFACE) | C | 10.0 mm | MEASURED VALUE −IDEAL VALUE |
| MAIN SCANNING MAGNIFICATION (FRONT SURFACE) | (SHEET LENGTH A IN MAIN SCANNING DIRECTION) −(C+G) | SHEET LENGTH A IN MAIN SCANNING DIRECTION −20 mm | (MEASURED VALUE −IDEAL VALUE)/2 |
| SUB-SCANNING MAGNIFICATION (FRONT SURFACE) | (SHEET LENGTH B IN SUB-SCANNING DIRECTION) −(D+H+F+J)/2 | SHEET LENGTH B IN SUB-SCANNING DIRECTION −20 mm | (MEASURED VALUE −IDEAL VALUE)/2 |
| LEAD POSITION (BACK SURFACE) | (SHEET LENGTH B IN SUB-SCANNING DIRECTION) −(D+H+F+J)/2 | 10.0 mm | MEASURED VALUE −IDEAL VALUE |
| SIDE POSITION (BACK SURFACE) | (SHEET LENGTH B IN SUB-SCANNING DIRECTION) −(D+H+F+J)/2 | 10.0 mm | MEASURED VALUE −IDEAL VALUE |
| MAIN SCANNING MAGNIFICATION (BACK SURFACE) | (SHEET LENGTH B IN SUB-SCANNING DIRECTION) −(D+H+F+J)/2 | SHEET LENGTH A MAIN SCANNING DIRECTION −20 mm | (MEASURED VALUE −IDEAL VALUE)/2 |
| SUB-SCANNING MAGNIFICATION (BACK SURFACE) | (SHEET LENGTH B IN SUB-SCANNING DIRECTION) −(D+H+F+J)/2 | SHEET LENGTH A SUB-SCANNING DIRECTION −20 mm | (MEASURED VALUE −IDEAL VALUE)/2 |
| SQUARENESS (FRONT SURFACE) | (D−H)/ [(SHEET LENGTH A IN MAIN SCANNING DIRECTION)−20] | 0.00 | MEASURED VALUE −IDEAL VALUE |
| SQUARENESS (BACK SURFACE) | (D−H)/ [(SHEET LENGTH A IN MAIN SCANNING DIRECTION)−20] | 0.00 | MEASURED VALUE −IDEAL VALUE |

FIG. 6

<POSITION ADJUSTMENT: INPUT MEASUREMENT VALUE>

| | FRONT SURFACE | BACK SURFACE |
|---|---|---|
| C | 0.00 mm | 0.00 mm |
| D | 0.00 mm | 0.00 mm |
| E | 0.00 mm | 0.00 mm |
| F | 0.00 mm | 0.00 mm |
| G | 0.00 mm | 0.00 mm |
| H | 0.00 mm | 0.00 mm |
| I | 0.00 mm | 0.00 mm |
| J | 0.00 mm | 0.00 mm |

FIG. 7

IMAGE FORMING APPARATUS AND METHOD FOR CONTROLLING IMAGE FORMING APPARATUS

BACKGROUND OF THE INVENTION

Field of the Invention

The present disclosure relates to an image forming apparatus such as a copying machine, a printer and the like and especially, relates to a technology for adjusting an image forming position to a sheet.

Description of the Related Art

When an image is formed by an image forming apparatus, the image is sometimes formed on a sheet deviated from an ideal position. This is called "position registration". Japanese Patent Application Laid-Open No. 2003-173109 discloses an image forming apparatus by which the position registration is corrected. The image forming apparatus forms a mark (reference image) on a predetermined position on both sides of a sheet. The mark is read by a reading apparatus. The image forming apparatus measures a distance from a sheet end part to the mark based on a read result and adjusts the image forming position in accordance with the measured distance.

The position registration is caused by various reasons. For example, due to a size or basis weight of a sheet or a sheet conveyance mechanism, the position registration is caused. In any case, by reading the reference image for detecting the position of the image formed on the sheet by the reading apparatus, it is possible to measure a position registration amount. By correcting the image forming position in accordance with the position registration amount, the image forming apparatus forms an image at an ideal position on the sheet. However, the image forming position is not accurately corrected if, due to an individual difference of the reading apparatus, a read error (a measurement error) occurs in the read result of the reference image.

For example, the reading apparatus which reads the image by scanning an A3 size sheet sometimes employs wire winding drive for scanning. Due to eccentricity of a pulley used in the wire winding drive or a curve of a scan rail, a reading part of the reading apparatus moves in a minutely inclined state with respect to a scanning direction. As a result, the reading image obtained by the reading inclines, which generates the read error. As a result, correction accuracy of the image forming apparatus is deteriorated. Further, two scan rails are sometimes arranged orthogonal to the scanning direction. In this case, due to the individual difference between the two scan rails, a difference occurs in a moving speed of the reading part which moves on the two scan rails. It means that the moving speed of one end part differs from the moving speed of the other end part in a direction orthogonal to the scanning direction in the reading part. Due to the difference in the moving speed, accurate image reading is prevented, which causes the read error. In the following, the read error is called "trapezoidal distortion". The trapezoidal distortion also causes to deteriorate the correction accuracy of the image forming apparatus. The present disclosure provides an image forming apparatus which suppresses the read error caused by the reading apparatus as described and corrects the image forming position with high accuracy.

SUMMARY OF THE INVENTION

An image forming apparatus according to the present disclosure includes: a reading unit, which comprises a carriage including a sensor and a platen for placing an original thereon, configured to read an original placed on the platen using the sensor while moving the carriage in a predetermined direction; an image forming unit configured to form an image on a sheet based on a read result of the original obtained by the reading unit; and a controller configured to: control the image forming unit to form a plurality of measurement images corresponding to four corners of the sheet on a predetermined surface of the sheet, wherein the plurality of measurement images includes a first measurement image, a second measurement image, a third measurement image, and a fourth measurement image, control the reading unit to read a first area on the predetermined surface of the sheet, wherein the first area includes an area in which the first measurement image is formed and an area in which the second measurement image is formed, control the reading unit to read a second area on the predetermined surface of the sheet, wherein the second area includes an area in which the third measurement image is formed and an area in which the fourth measurement image is formed, generate a read image relating to the predetermined surface of the sheet based on first read data relating to the first area read by the reading unit and second read data relating to the second area read by the reading unit, obtain position information of the plurality of measurement images based on the read image, adjust the position information of the plurality of measurement images based on a shape of the read image, and control a position of an image to be formed on the predetermined surface of the sheet by the image forming unit based on the adjusted position information of the plurality of measurement images.

Further features of the present invention will become apparent from the following description of exemplary embodiments (with reference to the attached drawings).

BRIEF DESCRIPTION OF THE DRAWINGS

FIG. 4 is an illustration diagram of a sheet management table.

FIG. 6 is an illustration diagram of a calculation table.

FIG. 7 is an illustration diagram of an input screen used to input a measurement result.

DESCRIPTION OF THE EMBODIMENTS

In the following, embodiments are described in detail with reference to the accompanying drawings.

Configuration

Figure 1:
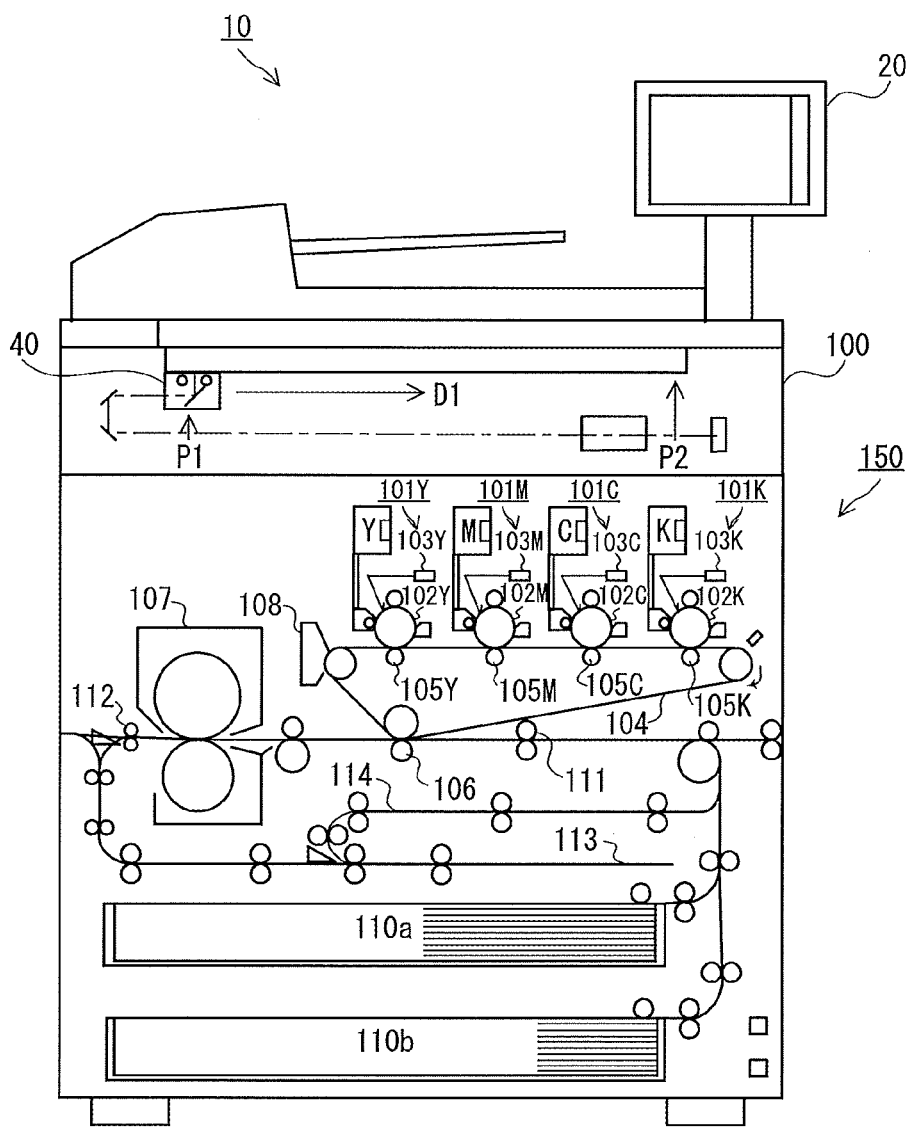
FIG. 1 is a configuration diagram of an image forming apparatus.

FIG. 1 is a configuration diagram of an image forming apparatus according to the present embodiment. An image forming apparatus 10 comprises a printer 150, an image scanner 100, and an operation part 20. The printer 150 forms an image on a sheet. The printer 150 may be a printer which forms a monochromatic image, but here, a printer configured to form a mixed color image is described. The image scanner 100 functions as a reading apparatus for reading an image formed on a sheet. The image scanner 100 also functions as a measurement device for measuring an image forming position on the sheet from the image read. The operation part 20 is a user interface and comprises various operation buttons, a display device, a touch panel and the like. When copying an original image is instructed by the operation part 20, the image forming apparatus 10 reads the image from the original by the image scanner 100.

The image scanner 100 comprises a reading part 40 (carriage) for reading the image from the original placed on a platen. The reading part 40 is, for example, an optical sensor for reading the original image by reflected light obtained by irradiating the original. The reading part 40 is capable of reading the original image of an entire surface of the original while moving on a rail (not shown) in an arrow D1 direction from a home position P1 to an end position P2. In the following description, the arrow D1 direction becomes a main scanning direction at the time of image reading by the image scanner 100 and a direction orthogonal to the arrow D1 direction becomes a sub-scanning direction at the time of image reading by the image scanner 100. The image scanner 100 generates image data (read data) representing the original image read and transmits the image data (read data) generated to the printer 150. The printer 150 executes image forming processing based on image data obtained.

The printer 150 comprises a plurality of image forming parts 101Y, 101M, 101C, and 101K. The image forming parts 101Y, 101M, 101C, and 101K respectively use toners of different colors to form toner images. The image forming part 101Y forms a yellow (Y) toner image. The image forming part 101M forms a magenta (M) toner image. The image forming part 101C forms a cyan (C) toner image. The image forming part 101K forms a black (K) toner image. Y, M, C, and K added at the end of each of the reference numerals indicate color. When matters common to all colors are described, Y, M, C, and K added at the end of the reference numerals are omitted. The printer 150 obtains the image data from the image scanner 100. Adding this, the printer 150 may obtain the image data from an information processing device such as a personal computer and the like (not shown).

The image forming part 101 comprises a photosensitive drum 102, an exposure device 103, a charger, and a developing device. The photosensitive drum 102 is a drum-shaped image carrier which rotates in a counterclockwise direction in the drawing. A surface of the photosensitive drum 102 is uniformly charged by the charger. The exposure device 103 irradiates the photosensitive drum 102 with laser light based on the image data. Thereby, an electrostatic latent image based on the image data is formed on the photosensitive drum 102. The electrostatic latent image formed on the photosensitive drum 102 is developed by the developing device. The developing device stores two-component developer containing a toner and a carrier. By supplying the toner to the photosensitive drum 102, the developing device visualizes the electrostatic latent image. A yellow toner image is formed on the photosensitive drum 102Y. A magenta toner image is formed on the photosensitive drum 102M. A cyan toner image is formed on the photosensitive drum 102C. A black toner image is formed on the photosensitive drum 102K. It is noted that a depth direction in FIG. 1 becomes a main scanning direction of the laser light irradiated to the photosensitive drum 102 at the time of forming the toner image. In the following description, the depth direction in FIG. 1 becomes a main scanning direction at the time of image formation on the sheet and a lateral direction in FIG. 1 becomes a sub-scanning direction at the time of image formation on the sheet.

The printer 150 comprises primary transfer devices 105Y, 105M, 105C, and 105K and an intermediate transfer belt 104 at a lower part of the image forming parts 101Y, 101M, 101C, and 101K. The primary transfer devices 105Y, 105M, 105C, and 105K transfer each toner image formed on the photosensitive drums 102Y, 102M, 102C, and 102K to the intermediate transfer belt 104. Thereby, the mixed color image is formed on the intermediate transfer belt 104. The intermediate transfer belt 104 is an image carrier which carries an image. The intermediate transfer belt 104 rotates in a clockwise direction in the drawing and conveys the formed toner image to a secondary transfer part 106 by rotation. The sheet is conveyed to the secondary transfer part 106 in accordance with timing at which the intermediate transfer belt 104 conveys the image to the secondary transfer part 106.

The sheet is stored in storage parts 110a and 110b provided in the printer 150. The sheets stored in the storage parts 110a and 110b are conveyed one by one by a sheet feeding roller. The sheet which is fed is conveyed to a registration roller 111 along a conveyance path. The registration roller 111 executes a skew correction of the sheet and the like. The registration roller 111 conveys the sheet to the secondary transfer part 106 in accordance with timing at which the toner image formed on the intermediate transfer belt 104 is conveyed to the secondary transfer part 106. When the toner image formed on the intermediate transfer belt 104 and the sheet pass the secondary transfer part 106, the toner image is transferred to the sheet from the intermediate transfer belt 104. The toner remaining on the intermediate transfer belt 104 after the transfer is cleaned by a belt cleaner 108.

The printer 150 comprises a fixing device 107. The sheet to which the toner image is transferred is conveyed to the fixing device 107 from the secondary transfer part 106. The fixing device 107 comprises a plurality of rollers and heaters. The fixing device 107 heats and pressurizes the unfixed toner image having transferred to the sheet by the roller and the heater. Thereby, the toner image is fixed on the sheet. Thereby, the image formation on the sheet ends. The sheet having the image formation thereon ended is discharged outside the printer 150 (image forming apparatus 10) from the fixing device 107 by a discharge roller 112.

When double-side printing is executed, the sheet having the image formed on a first surface (front surface) is conveyed to a reverse path 113 by a flapper after passing through the fixing device 107. The sheet the conveyance direction of which is reversed at the reverse path 113 is conveyed to a double-side path 114. By being conveyed from the reverse path 113 to the double-side path 114, front and back side of the sheet is reversed. The sheet having the front and back side reversed is again conveyed to the registration roller 111 via the double-side path 114. Then, similar to the first surface, the image formation is executed on a second surface (back surface) which is different from the first surface. After executing the image formation on the second surface, the sheet is discharged outside the printer 150 (image forming apparatus 10) by the discharge roller 112. The image forming apparatus 10 forms the output image on the sheet in this way.

One of the image qualities at the time of double-side printing is that the image forming position of the output image on the front surface matches the image forming position of the output image of the back surface. When confirming the image forming position of the front surface and the image forming position of the back surface, a measurement chart described later is used. The measurement chart is a sheet on which a measurement image for measuring the image forming position is formed. The image forming position of the front surface and the image forming position of the back surface are measured using the measurement chart having the measurement images formed on both sides of the sheet. In accordance with the measurement result of the image forming position of the front surface and the measurement result of the image forming position of the back surface, a registration amount of the image forming position (position registration amount) on both sides is corrected. By the correction, the image forming position of the front surface is made to match with the image forming position of the back surface.

(Controller)

Figure 2A:
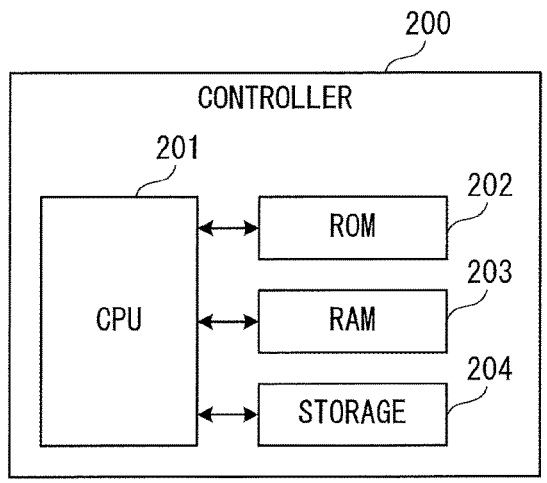
FIG. 2A and FIG. 2B are configuration diagrams of controller.
Figure 2B:
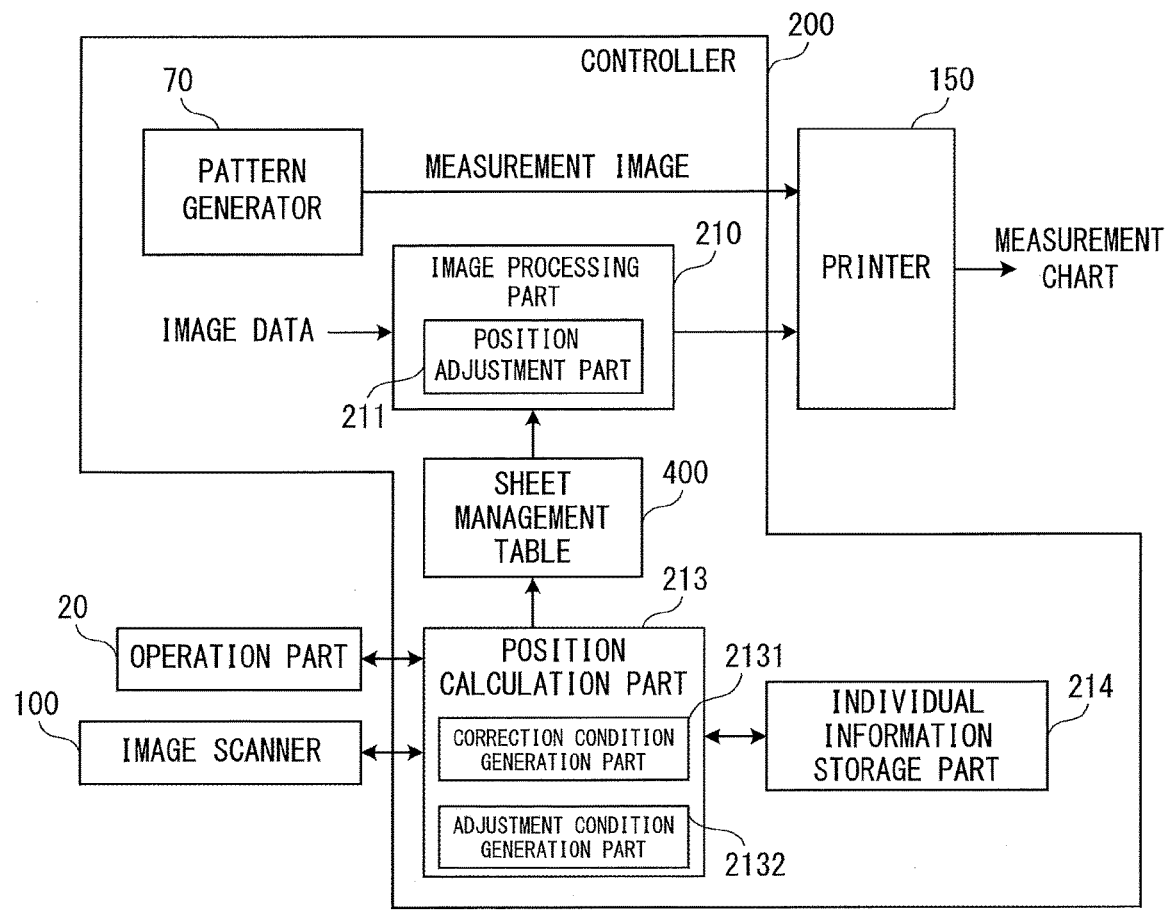

FIG. 2A and FIG. 2B are configuration diagrams of controllers for controlling operation of the image forming apparatus 10 having the configuration as above. The controller 200 is incorporated in the image forming apparatus 10. FIG. 2A is a hardware configuration diagram of the controller 200. The controller 200 comprises a central processing unit (CPU) 201, a read only memory (ROM) 202, a random access memory (RAM) 203, and a storage 204.

The CPU 201 controls the operation of the image forming apparatus 10 by executing computer programs stored in the ROM 202 and the storage 204 using the RAM 203 as a work area. The storage 204 is a mass storage device such as a hard disk drive (HDD), a solid state drive (SSD), and the like. The storage 204 stores the image data obtained from the image scanner 100 or an external information processing device, various setting information input through the operation part 20, and the like. In particular, in the present embodiment, the storage 204 stores an adjustment condition for correcting the image forming position.

FIG. 2B is a functional block diagram of the image forming apparatus 10. In the present embodiment, functions for executing the correction of the image forming position are described and functions for the image formation by the image forming apparatus 10 are omitted. By executing, by the CPU 201, the computer program, the controller 200 functions as an image processing part 210, a position calculation part 213, an individual information storage part 214, a sheet management table 400, and a pattern generator 70. It is noted that, in addition to being realized by executing the computer program, each function of the controller 200 may be realized by a discreet product or one-chip semiconductor product. The one-chip semiconductor product includes, for example, a micro-processing unit (MPU), an application specific integrated circuit (ASIC), and a system-on-a-chip (SOC).

The image processing part 210 includes a position adjustment part 211. The image processing part 210 corrects the image data so that a desired image is formed on the sheet by executing various image processing to the image data. The image processing executed by the image processing part 210 is, for example, gradation correction processing or image forming position correction processing. The image data corrected by the image processing part 210 is transmitted to the exposure device 103 of the printer 150. The exposure device 103 irradiates the photosensitive drum 102 with laser light modulated based on the image data corrected by the image processing part 210 to form the electrostatic latent image based on the image data on the photosensitive drum 102.

The position adjustment part 211 corrects the image forming position on the sheet based on the adjustment condition. The position adjustment part 211 corrects the image data in a known method so that the image forming position on the sheet becomes a target position.

The image may be formed at a position away from an ideal image forming position on a sheet. For example, when the sheet passes through the secondary transfer part 106 with inclination with respect to a sheet conveyance direction, the image is formed inclined with respect to the sheet. Further, when a pressure distribution of the roller of the fixing device 107 is not uniform, the sheet which is in the midst of fixing processing deforms so that the image is formed inclined with respect to the sheet. Further, when executing the double-side printing, at the time of image formation on the front surface, an expansion or a contraction of the sheet occurs due to the heat and pressure of the fixing device 107, which causes difference in sizes of the image formed on the front surface and the image formed on the back surface (double-side magnification error). In this case, the image forming position on the front surface of the sheet differs from the image forming position of the back surface of the sheet.

Reproducibility of the inclination of the sheet passing through the secondary transfer part 106 and a sheet deformation amount in the fixing device 107 are high if the sheet size, the basis weight, material and the like are the same. The image forming apparatus 10 of the present embodiment deforms a shape of the image to be formed in accordance with the sheet deformation amount so that the image forming position with respect to the sheet becomes an ideal image forming position. Based on the adjustment condition stored in the sheet management table 400, the position adjustment part 211 transforms the image data. The adjustment condition is, for example, a transformation expression and the like for correcting the registration of the image forming position with respect to the sheet. For example, when the magnification in the main scanning direction at the time of image formation on the sheet becomes 1.1 times, the position adjustment part 211 corrects the image data so that a length in the main scanning direction at the time of image formation of the image to be formed becomes 1/1.1 times. Thus, the magnification in the main scanning direction at the time of image formation of the image to be formed on the sheet becomes 1.0 time. Further, when coordinates of a predetermined pixel are shifted in a predetermined direction by 0.1 pixel, the position adjustment part 211 corrects the image data so as to shift the coordinates of the pixel in a reverse direction by 0.1 pixel. Thereby, the pixel is formed on an ideal position of the sheet. The image forming part 101 forms the image based on the image data transformed by the position adjustment part 211. Thereby, the image having cancelled the registration of the image forming position with respect to the sheet is formed on the intermediate transfer belt 104. It is noted that the sheet management table 400 stores a position registration amount of the image forming position and the adjustment condition for suppressing the position registration amount generated by the position calculation part 213 for a type of the sheet. The sheet management table 400 is formed, for example, in the storage 204.

Figure 3:
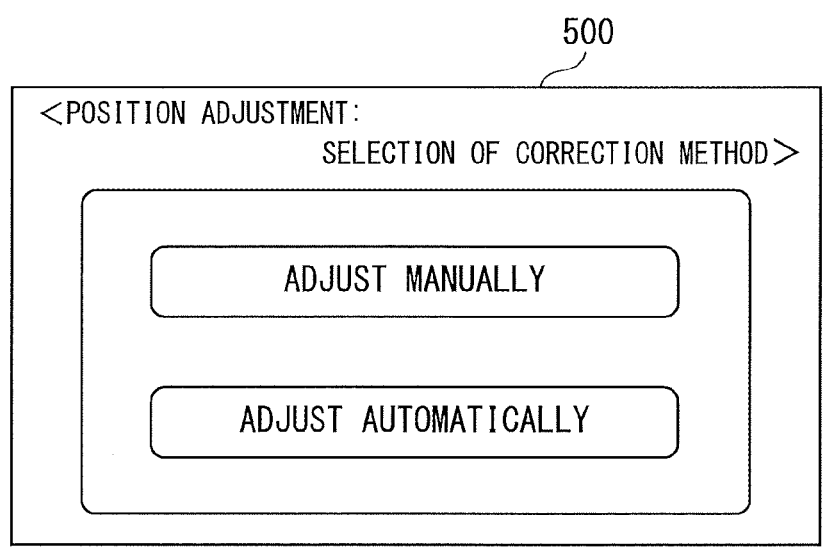
FIG. 3 is an illustration diagram of a selection screen.

The position calculation part 213 measures the position registration amount of the image forming position and generates the correction condition and the adjustment condition described later. Thereby, the position calculation part 213 comprises a correction condition generation part 2131 and an adjustment condition generation part 2132. The position calculation part 213 measures the position registration amount of the image forming position by one of the adjustment condition generation modes of a manual mode or an automatic mode. The adjustment condition generation mode is selected using the operation part 20. FIG. 3 is an illustration diagram of a selection screen for selecting the adjustment condition generation mode. A selection screen 500 is displayed on the operation part 20 when, for example, an adjustment condition generation instruction for correcting the image forming position is input from the operation part 20. A user selects one of the manual mode or the automatic mode from the selection screen 500 through the operation part 20. The position calculation part 213 obtains the selection result from the operation part 20, measures the position registration amount of the image forming position by the adjustment condition generation mode in accordance with the selection result, and generates the adjustment condition for the position registration amount measured.

The pattern generator 70 transmits measurement image data which is the image data for forming the measurement image used to measure the image forming position to the printer 150. The printer 150 generates the measurement chart by forming the measurement image in accordance with the measurement image data on the sheet.

In the manual mode, the user measures the position of the measurement image formed on the measurement chart and inputs the measurement result into the position calculation part 213 through the operation part 20. The position calculation part 213 measures the position registration amount of the image forming position from the measurement result input from the operation part 20, generates the adjustment condition of the position registration amount, and stores the adjustment condition generated in the sheet management table 400. In the automatic mode, the image scanner 100 reads the position of the measurement image formed on the measurement chart and inputs the read result (read image) into the position calculation part 213. The position calculation part 213 measures the position of the measurement image (coordinate data) from the read image, generates the adjustment condition, and stores the adjustment condition generated in the sheet management table 400.

The individual information storage part 214 stores the correction condition generated to reduce a measurement error of the image forming position caused by the individual difference of the image scanner 100. The position calculation part 213 generates the correction condition based on the measurement result of the measurement image obtained by the image scanner 100. By applying the correction condition to the measurement result of the measurement image obtained from the image scanner 100, the position calculation part 213 reduces the measurement error caused by the individual difference of the image scanner 100 included in the measurement result. The position calculation part 213 generates the adjustment condition of the position registration amount of the image forming position in accordance with the measurement result having the measurement error reduced.

(Sheet Management Table)

FIG. 4 is an illustration diagram of the sheet management table 400. Sheets managed by the sheet management table 400 includes, for example, sheets which are available in a market evaluated by a printer manufacturer, sheets registered by the user through the operation part 20, or the like. The sheet management table 400 is stored in the storage 204 in a file format such as, for example, XML (Extensible Markup Language), CSV (Comma-Separated Values) and the like. The sheet management table 400 can execute reading, writing and updating as appropriate.

Attribute data for each type of a sheet is registered in the sheet management table 400. The type of the sheet is identified by a sheet name 511. The attribute data includes data indicating physical features of the sheet such a sheet width 512, a sheet length 513, basis weight of the sheet 514, a surface property of the sheet 515, and a sheet color 516. Further, the attribute data includes information 517 (preprinted paper 517) which is information on whether the sheet is a preprinted paper or not, a position registration amount of the front surface 518, and the position registration amount of the back surface 519. The surface property of the sheet 515 indicates, for example, the physical property of the surface of the sheet such as a plain paper, embossed, double-side coated, and the like. In general, coating processing is executed to improve glossiness of the sheet surface. Embossing processing is processing to apply unevenness on the sheet surface. The sheet color 516 represents a color of the sheet. The information 517 on whether the sheet is the preprinted paper or not shows whether the sheet used for printing is the preprinted paper or not. The preprinted paper is, for example, a sheet on which ruled lines, frames or the like are printed in advance.

The position registration amount 518 is a value which quantitatively represents the position registration from an ideal image forming position on the front surface of the sheet. The position registration amount 519 is a value which quantitatively represents the position registration from an ideal image forming position on the back surface of the sheet. The image is formed on the ideal position with respect to the sheet by correcting the image forming position on the sheet at the time of image formation in accordance with the position registration amounts 518 and 519. The image forming apparatus 10 executes the image formation by adjusting the image forming position to cancel the position registration amount. In the present embodiment, the position registration amounts 518 and 519 are represented by a lead position, a side position, a main scanning magnification, and a sub-scanning magnification.

The lead position represents the position registration amount of the image forming position in the sub-scanning direction at the time of image formation with respect to the sheet. The side position represents the position registration amount of the image forming position in the main scanning direction at the time of image formation with respect to the sheet. The lead position is an image formation start position with a leading edge in a sheet conveyance direction as a starting point. An initial value of the lead position is "0". The side position is an image formation start position with the sheet end part of a left side in a sheet conveyance direction as a starting point. An initial value of the side position is "0". The lead position and the side position are adjusted by, for example, controlling, by the exposure device 103, irradiation start timing of the laser light irradiated to the photosensitive drum 102. The sub-scanning magnification represents a deviation in an image length (magnification relative to an ideal length) in the sub-scanning direction at the time of image formation. The sub-scanning magnification is adjusted by, for example, controlling a rotation speed of the intermediate transfer belt 104. The main scanning magnification represents the deviation in the image length (magnification relative to the ideal length) in the main scanning direction at the time of image formation. The main scanning magnification is adjusted by, for example, controlling a clock frequency of the laser light when modulating the laser light based on the image data in the exposure device 103. Initial values of the sub-scanning magnification and the main scanning magnification are "0".

As described, the image forming apparatus 10 is operable in two adjustment condition generation modes of the manual mode and the automatic mode. In the manual mode, the user measures the measurement chart using a ruler and the like and inputs the measurement result through the operation part 20. The position calculation part 213 obtains the position registration amounts 518 and 519 based on the measurement result input. In the automatic mode, the image scanner 100 reads the measurement chart. Then, based on the position of the measurement image in the measurement chart, the position calculation part 213 obtains the position registration amounts 518 and 519. The position calculation part 213 adapts the position registration amounts 518 and 519 as the attribute data of the sheet to execute new registration or update of the attribute data previously registered to the sheet management table 400.

(Position Registration Amount)

Figure 5:
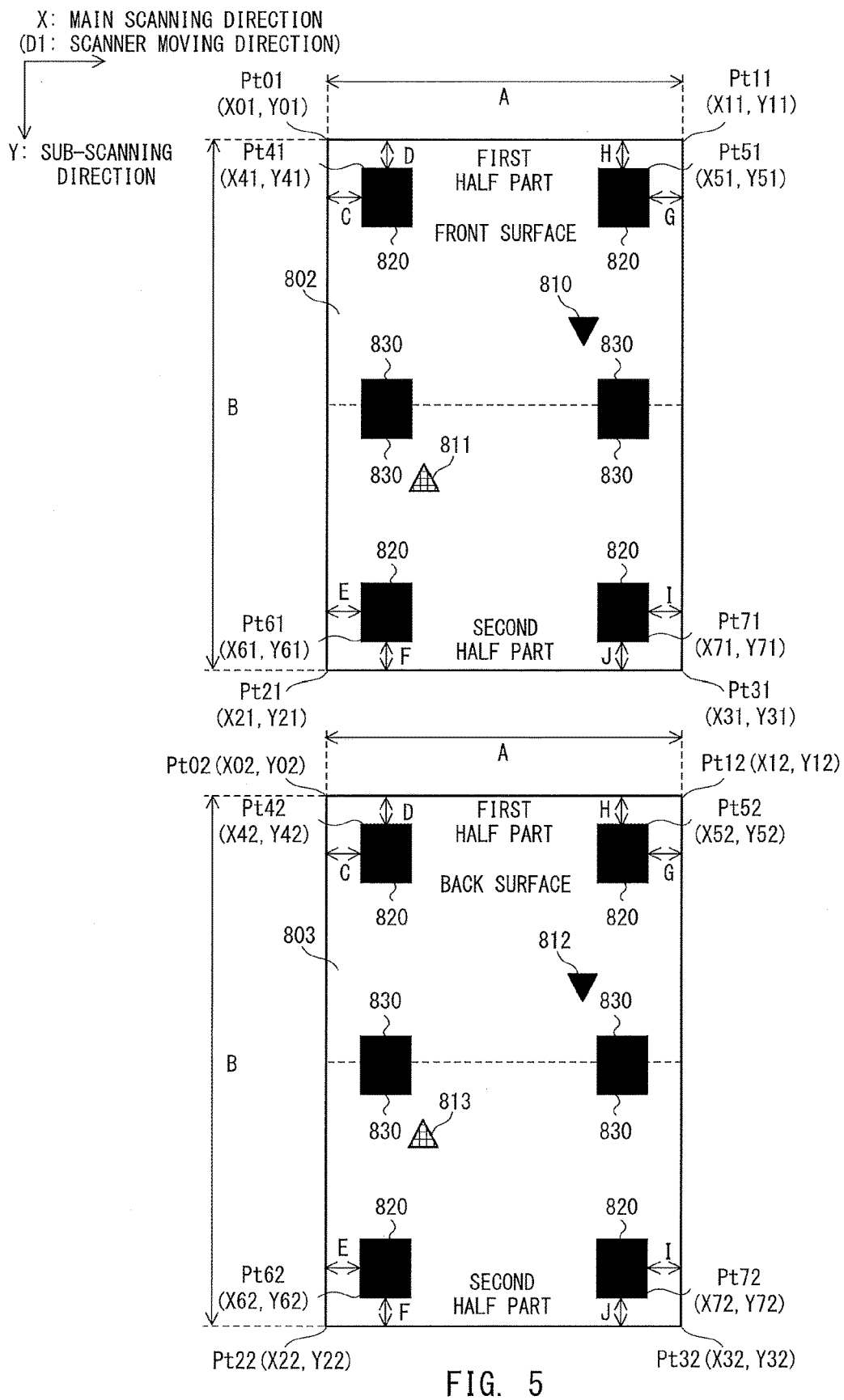
FIG. 5 is an explanatory diagram of a measurement chart.

FIG. 5 is an explanatory diagram of the measurement chart. The measurement chart is constituted by forming measurement images 820 at predetermined positions of a front surface 802 and a back surface 803 of the sheet. In the present embodiment, eight measurement images 820 in total are formed at four corners on both sides of the measurement chart. If the measurement images 820 are formed at ideal positions, the measurement images 820 are formed at positions with a predetermined distance from the sheet end part of the measurement chart. The measurement images 820 are formed in a color having a large difference in reflectance relative to the color of the sheet. For example, black measurement images 820 are formed for a white color sheet.

By forming the measurement images 820 having the large difference relative to the color of the sheet, it becomes possible to measure a distance from the sheet end part of the measurement images 820 with high accuracy from the read image of the measurement chart obtained by the image scanner 100. In the manual mode, the user measures the distance from the sheet end part to the measurement images 820. In accordance with the distance of the measurement images from the sheet end part, the position registration amounts 518 and 519 are obtained.

For example, the image scanner 100 reads the measurement chart by dividing into two parts of a first half part and a second half part for each page, for each page. In this case, the measurement chart includes a mark 830 used to combine the read image of the first half part and the read image of the second half part. Two marks 830 are formed each on the front surface 802 and the back surface 803 of the measurement chart. The position calculation part 213 combines each read image of the first half part and the second half part so that a center position of the mark 830 of the read image of the first half part matches a center position of the mark 830 of the read image of the second half part. Thereby, the read image of one sheet (measurement chart) is generated.

The measurement chart includes marks 810, 811, 812, and 813 which function as markers for positioning when the measurement chart is read by the image scanner 100. The marks 810, 811, 812, and 813 are formed in different colors. For example, the mark 810 is blue, the mark 811 is yellow, the mark 812 is red, and the mark 813 is green. When the image scanner 100 is made to read the measurement chart, the colors of the marks 810, 811, 812, and 813 are specified in order in the operation part 20. The user causes the image scanner 100 to read the measurement chart in the order of the color specified. This prevents duplicate reading of the measurement chart.

The measurement chart as described is formed by the same measurement image 820 irrespective of the adjustment condition generation mode. It is noted that from a viewpoint of easy measurement, the measurement chart may be formed by other measurement image 820 in accordance with the adjustment condition generation mode. In this case, a plurality of image data representing different measurement images 820 is stored in the pattern generator 70. In accordance with the adjustment condition generation mode input through the operation part 20, the image data is appropriately transmitted from the pattern generator 70 to the printer 150.

FIG. 6 is an illustration diagram of a calculation table for obtaining the position registration amount from the measurement result of the distance of the measurement image 820 from the sheet end part read from the measurement chart. The calculation table 600 is stored in the storage 204. The controller 200 calculates the position registration amount based on the calculation table 600.

As described in FIG. 4, the position registration amounts 518 and 519 are represented by the items for the front surface and the items for the back surface. The calculation table 600 shows a transformation expression of the position registration amount for each item of the front surface and the back surface. In addition to the lead position, the side position, the main scanning magnification, and the sub-scanning magnification, squareness is included as the item representing the position registration amounts 518 and 519. The squareness is defined from distances D and H which are distances from a side connecting the coordinates Pt01 and the coordinates Pt11 of the sheet to the measurement image 820 (see FIG. 5) and a sheet length A in the main scanning direction at the time of image reading (see FIG. 5). A to J used in the transformation expression of each item represent the measurement result of the distance of the measurement image 820 from the sheet end part shown in FIG. 5. The adjustment condition is generated to cancel the position registration amount calculated by these transformation expressions. It means that the position registration amount is a parameter for defining the transformation expression which is one example of the adjustment condition. In a broad sense, the position registration amount itself is the adjustment condition. It is noted that the main scanning direction and the sub-scanning direction in FIG. 6 are directions at the time of the image reading.

In the automatic mode, the image scanner 100 reads both sides of the measurement chart by respectively dividing into two times of the first half part and the second half part. This is because it is necessary to emphasize the sheet end part of the measurement chart on the platen as the sheet end part of the measurement chart is detected by the position calculation part 213 by edge detection. It is noted that, for this emphasis, the measurement chart may be pressed against the platen by a black pressure plate or the like. When reading the first half part of the measurement chart, the measurement chart is placed on the platen so that the second half part is protruded to the front side in FIG. 1. When reading the second half part of the measurement chart, the measurement chart is rotated by 180 degrees from a state in which the first half part is read and placed on the platen so that the first half part already read is protruded to the front side in FIG. 1.

In first reading operation, the image scanner 100 reads the first half part of the front surface of the measurement chart while moving the reading part 40 from the home position P1 to the end position P2. In second reading operation, the image scanner 100 reads the second half part of the front surface of the measurement chart while moving the reading part 40 from the home position P1 to the end position P2. In third reading operation, the image scanner 100 reads the first half part of the back surface of the measurement chart while moving the reading part 40 from the home position P1 to the end position P2. In fourth reading operation, the image scanner 100 reads the second half part of the back surface of the measurement chart while moving the reading part 40 from the home position P1 to the end position P2. Through the four reading operations as above, the measurement images on both sides of the measurement chart are read.

The position calculation part 213 combines the read image of the first half part of the front surface and the read image of the second half part of the measurement chart in accordance with the position of the mark 830. The position calculation part 213 obtains the coordinates Pt01 (X01, Y01) to the coordinates Pt71 (X71, Y71), and the coordinates Pt02 (X02, Y02) to the coordinates Pt72 (X72, Y72) as shown in FIG. 5 from the combined read image. The coordinates are represented by Ptij (Xij, Yij). i is an identification number indicating a position. j is an identification number indicating a front surface (j=1) or a back surface (j=2). The coordinate Pt01 is a coordinate of an upper left corner on the front surface 802 of the measurement chart (in the following description, the first half part side of the measurement chart is an upper side, the second half part side of the measurement chart is a lower side, and right and left is a right and left direction when the first half part side is viewed). The coordinate Pt11 is a coordinate of an upper right corner on the front surface 802 of the measurement chart. The coordinate Pt21 is a coordinate of a lower left corner on the front surface 802 of the measurement chart. The coordinate Pt31 is a coordinates of a lower right corner on the front surface 802 of the measurement chart. The coordinate Pt41 is a coordinate of the upper left corner in the measurement image 820 formed at the upper left of the front surface 802. The coordinate Pt51 is a coordinate of the upper right corner in the measurement image 820 formed at the upper right of the front surface 802. The coordinate Pt61 is a coordinate of the lower left corner in the measurement image 820 formed at the lower left of the front surface 802. The coordinate Pt71 is a coordinate of the right lower corner in the measurement image 820 formed at the lower right of the front surface 802. As for the back surface 803, the coordinates are similarly defined.

In the automatic mode, the position registration amount is measured from the read image of the measurement chart read by the image scanner 100. The individual difference of the image scanner 100 causes an error in the read image. Because of that, when obtaining the position registration amount, a correction condition for reducing the read error becomes necessary. In the manual mode, the image scanner 100 is not required, so that processing to reduce the read error caused by the image scanner 100 is not required.

(Manual Mode)

FIG. 7 is an illustration diagram of an input screen for the manual mode used to input the measurement result. When the manual mode is set, an input screen 700 is displayed on the operation part 20. On the input screen 700, guidance indicating portions of the measurement chart to be measured and input boxes for inputting the measurement results are provided. In this example, the user measures parameters C to J for each of the front surface 802 and the back surface 803 of the measurement chart and inputs the measurement results to the corresponding input boxes through the operation part 20.

The position calculation part 213 calculates the position registration amount of the image forming position using the transformation expressions shown in the calculation table 600 based on the measurement results input from the input screen 700. The position calculation part 213 obtains the position registration amount of the "lead position", "side position", "main-scanning magnification", "sub-scanning magnification", and "squareness" of both sides of the measurement chart by substituting the measurement result into calculation expressions registered in the calculation table 600. The position calculation part 213 registers the position registration amounts of each item calculated in the position registration amounts 518 and 519 of the sheet management table 400 as the sheet attribute data.

(Automatic Mode)

Figure 8:
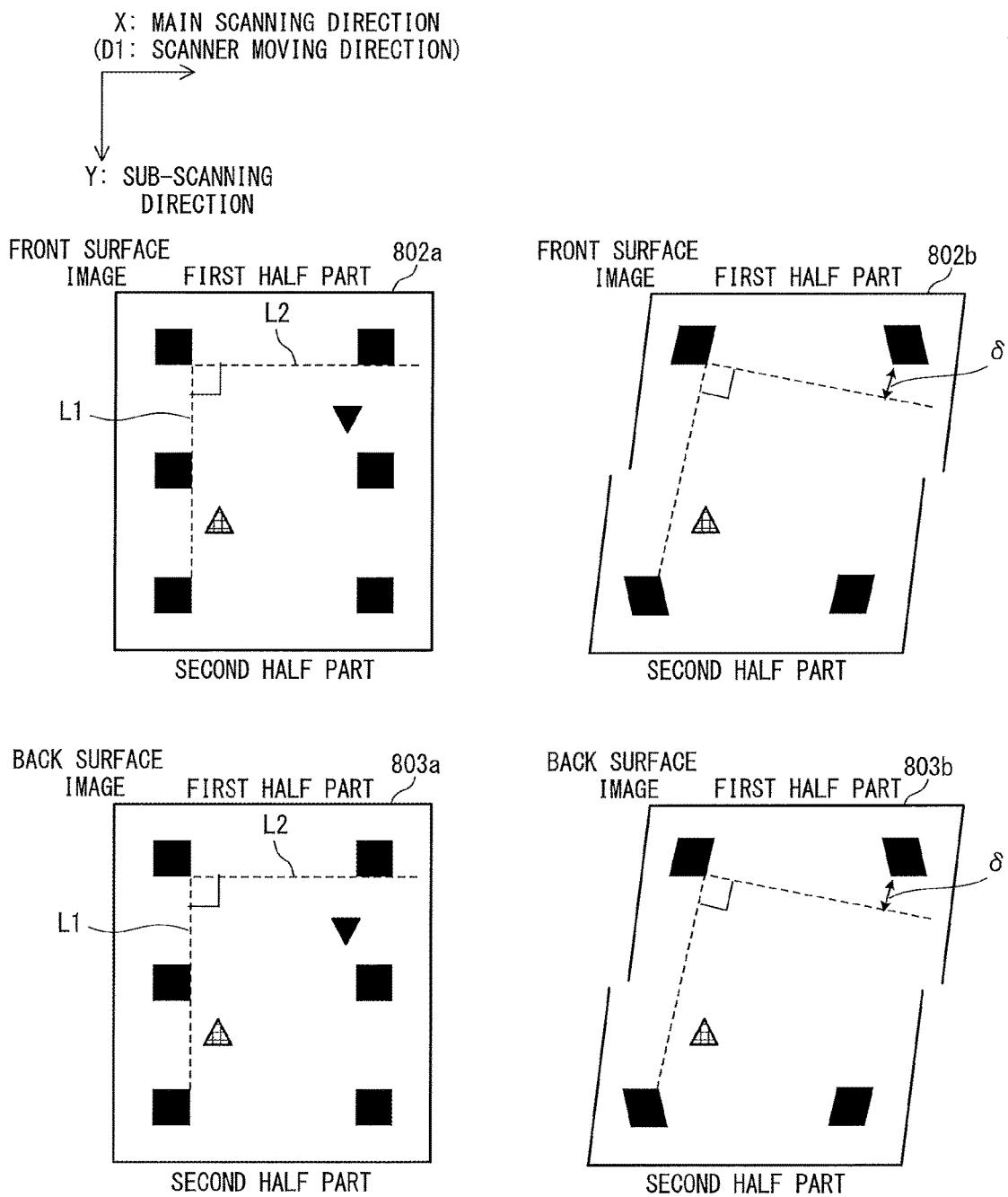
FIG. 8 is an explanatory diagram of an individual difference of an image scanner.

FIG. 8 is a diagram explaining the individual difference of the image scanner 100. The image forming apparatus 10 outputs the measurement chart having the measurement images formed on both sides of the sheet by executing the double-side printing. A front surface image 802a and a back surface image 803a illustrate both sides of the measurement chart having the measurement images formed thereon. The measurement images are formed with correct squareness by the image forming apparatus 10 on each of the front surface image 802a and the back surface image 803a of the measurement chart.

The image scanner 100 comprises a scan rail for the reading part 40 to move from the home position P1 to the end position P2. A flatness deviation of the scan rail, a distortion of a housing of the image scanner 100, an error in a focal point of the reading part 40, or the like causes error in the squareness in the read image of the measurement chart. The front surface image 802b and the back surface image 803b represent the result (read image) of reading the measurement chart by the image scanner 100. As described, the image scanner 100 reads both sides of the measurement chart by dividing into the first half part and the second half part. So, the read images divided into the first half part and the second half part are respectively obtained as the front surface image 802b and the back surface image 803b. As shown by the front surface image 802b and the back surface image 803b, a squareness deviation δ occurs in the read image of the measurement chart obtained by the image scanner 100. The squareness deviation δ is a read error which is individually uniquely caused by a part tolerance and assembly process of the image scanner 100. The squareness deviation δ is one of the correction conditions which is obtained from the read image of the measurement chart by the position calculation part 213 and is stored in the individual information storage part 214.

It is noted that the squareness deviation δ is represented by a unit of distance. In the present embodiment, the squareness deviation δ is represented by a distance between a straight line L2 which is orthogonal to a straight line L1 connecting the lower right corner in measurement image 820 formed at the upper left and the upper right corner in the measurement image 820 formed at the lower left of the measurement chart, and the lower left corner in the measurement image 820 formed at the upper right of the measurement chart. It is noted that, adding the above, the squareness deviation δ may be represented by a distance between a straight line which is orthogonal to a straight line connecting the upper left corner in the upper left measurement image 820 and the lower left corner in the lower left measurement image 820, and the upper right corner in the upper right measurement image 820. The squareness deviation δ indicates the position registration amount of the image forming position in the sub-scanning direction at the time of image reading of the measurement chart.

Figure 9:
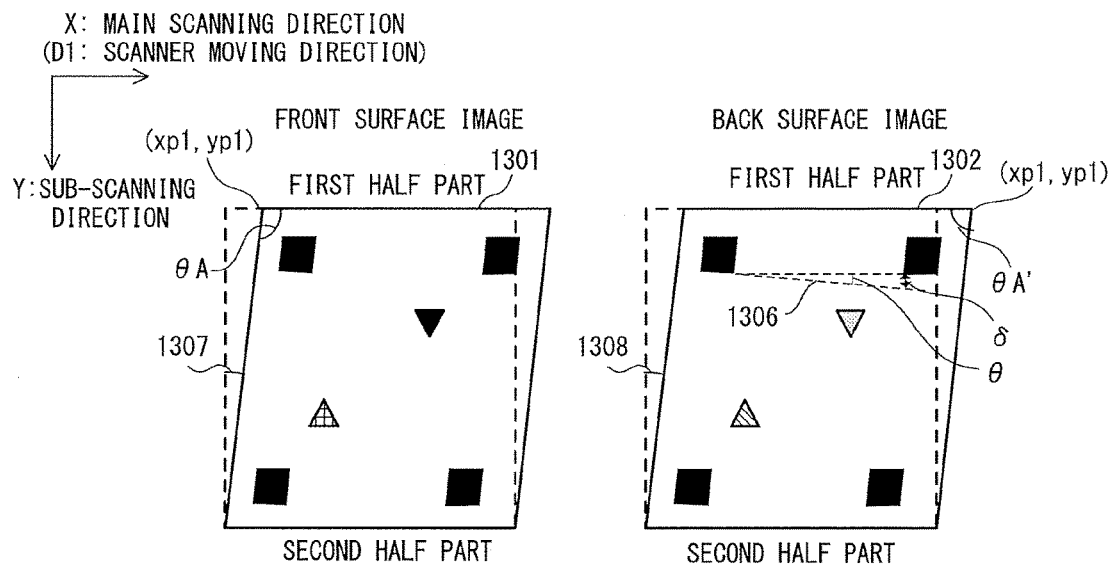
FIG. 9 is an explanatory diagram of a read error of squareness.

FIG. 9 is an explanatory diagram of the read error of the squareness caused by the individual difference of the image scanner 100. The measurement chart which is read by dividing into the first half part and the second half part by the image scanner 100 is combined by the position calculation part 213 based on the mark 830. A front surface image 1301 is the read image in which the front surface images 802a and 802b in FIG. 8 are combined. A back surface image 1302 is the read image in which the back surface images 803a and 803b in FIG. 8 are combined. Here, the measurement images 820 are formed with correct squareness on both sides of the measurement chart (front surface 802 and back surface 803). The measurement chart is placed on the platen so that both sides of the measurement chart (front surface 802 and back surface 803) do not skew to the main scanning direction at the time of image reading by the image scanner 100 and read.

The upper left corner of the front surface image 1301 is the coordinates (xp1, yp1) and an angle θA. In the back surface image 1302, the upper right corner which corresponds to the upper left corner of the front surface image 1301 is an angle θA'. Due to the read error of the squareness, the front surface image 1301 is deformed with respect to an ideal rectangular read image shown by a broken line. A degree of deformation 1307 is represented by an error angle θ. The back surface image 1302 is deformed similarly. A degree of deformation 1308 is represented by the error angle θ which is the same angle as the degree of deformation 1307. The error angle θ is represented by the following expression.

$$\theta = (\theta A - \theta A')/2 \quad \text{(Expression 1)}$$

Due to the squareness deviation δ, a straight line 1306 which is orthogonal to a straight line connecting the lower right corner in the measurement image formed at the upper left and the upper right corner in the measurement image formed at the lower left of the back surface image 1302 is deviated by the error angle θ as compared to a case where there is no read error.

Figure 10:
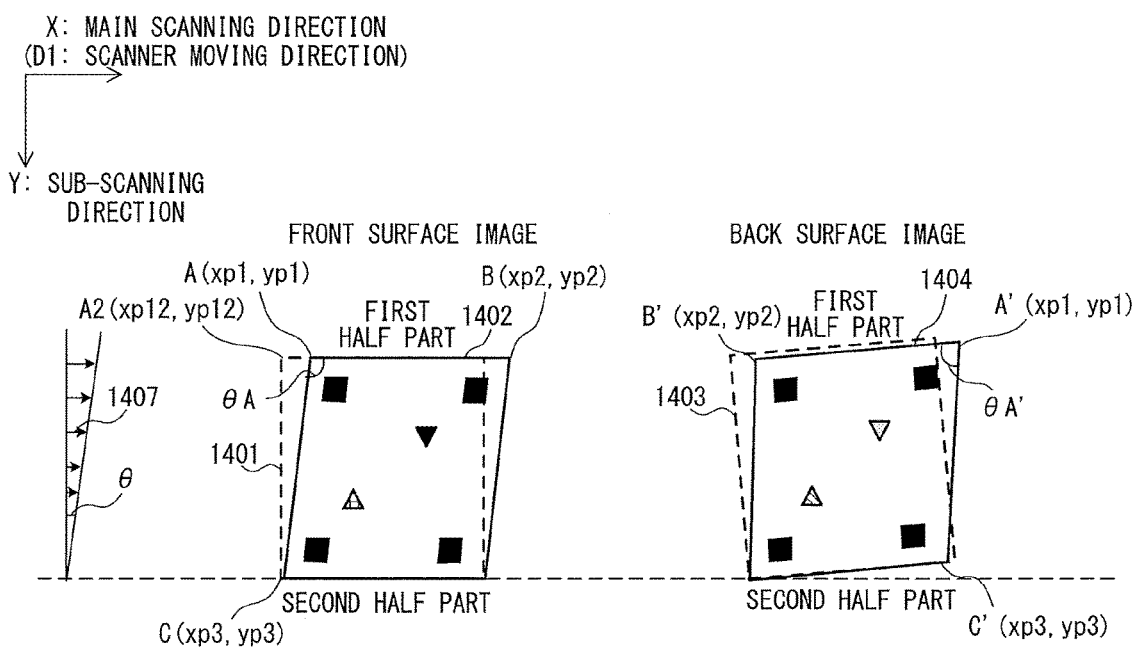
FIG. 10 is an explanatory diagram of how to obtain the individual difference of the image scanner.

FIG. 10 is an explanatory diagram of how to obtain the individual difference of the image scanner 100. Here, how to obtain the squareness deviation δ is described.

A front surface image 1402 is a read image in which the front surface images 802a and 802b in FIG. 8 are combined. The front surface image 1402 is placed on the platen so that the measurement chart does not skew to the main scanning direction at the time of image reading by the image scanner 100 and read. Due to the read error, the front surface image 1402 is deformed with respect to an ideal rectangular read image 1401 shown by a broken line. The upper left corner of the front surface image 1402 is the coordinates A (xp1, yp1) and an angle θA. The upper right corner of the front surface image 1402 is the coordinates B (xp2, yp2). The lower left corner of the front surface image 1402 is the coordinates C (xp3, yp3).

A back surface image 1404 is a read image in which the read image of the first half part and the read image of the second half part of the back surface are combined. The back surface image 1404 is read by placing the measurement chart on the platen so that the measurement chart skews to the main scanning direction at the time of image reading by the image scanner 100. In the back surface image 1404, the upper right corner which corresponds to the upper left corner of the front surface of the measurement chart is the coordinates A' (xp1, yp1) and the angle θA'. In the back surface image 1404, the upper left corner which corresponds to the upper right corner of the front surface of the measurement chart is the coordinates B' (xp2, yp2). In the back surface image 1404, the lower right corner which corresponds to the lower left corner of the front surface of the measurement chart is the coordinates C' (xp3, yp3). Due to the read error, the back surface image 1404 is deformed with respect to a read image 1403 shown by a dotted line which is read in a skew state.

As the back surface image 1404 is generated by being read from the measurement chart placed on the platen so as to skew to the main scanning direction at the time of image reading, the error angle θ cannot be calculated by the (expression 1). This is because squareness deviation amount 1407 varies depending on each position in the sub-scanning direction at the time of image reading by the image scanner 100 so that the squareness deviation amounts at the same positions A an A' on the measurement chart vary. Thereby, the error angle θ is obtained so that the angle θA matches the angle θA' when the squareness deviation amount 1407 at each position in the sub-scanning direction at the time of image reading is corrected in a reverse direction to the front surface image 1402 and the back surface image 1404. Assuming that the coordinate in the sub-scanning direction at the time image reading of the coordinates C of the lower left corner of the front surface image 1402 is "0", the coordinates A2 (xp12, yp12) obtained by correcting the squareness deviation amount 1407 with respect to the coordinates A of the upper left corner in the reverse direction is represented by the following expression.

$$yp12 = yp1 \quad \text{(Expression 2)}$$

$$xp12 = xp1 - \tan\theta * yp12 \quad \text{(Expression 3)}$$

By applying the similar expression, the coordinates reversely corrected are obtained for the coordinates B of the upper right corner and the coordinates C of the lower left corner of the front surface image 1402 and the coordinates A' of the upper right corner, the coordinates B' of the upper left corner, and the coordinates C' of the lower right corner of the back surface image 1404. The squareness deviation amount δ is obtained by the angle θ which matches the angle θA and the angle θA' after the reverse correction or the angle θ which most approaches.

(Correction of Image Forming Position)

Figure 11:
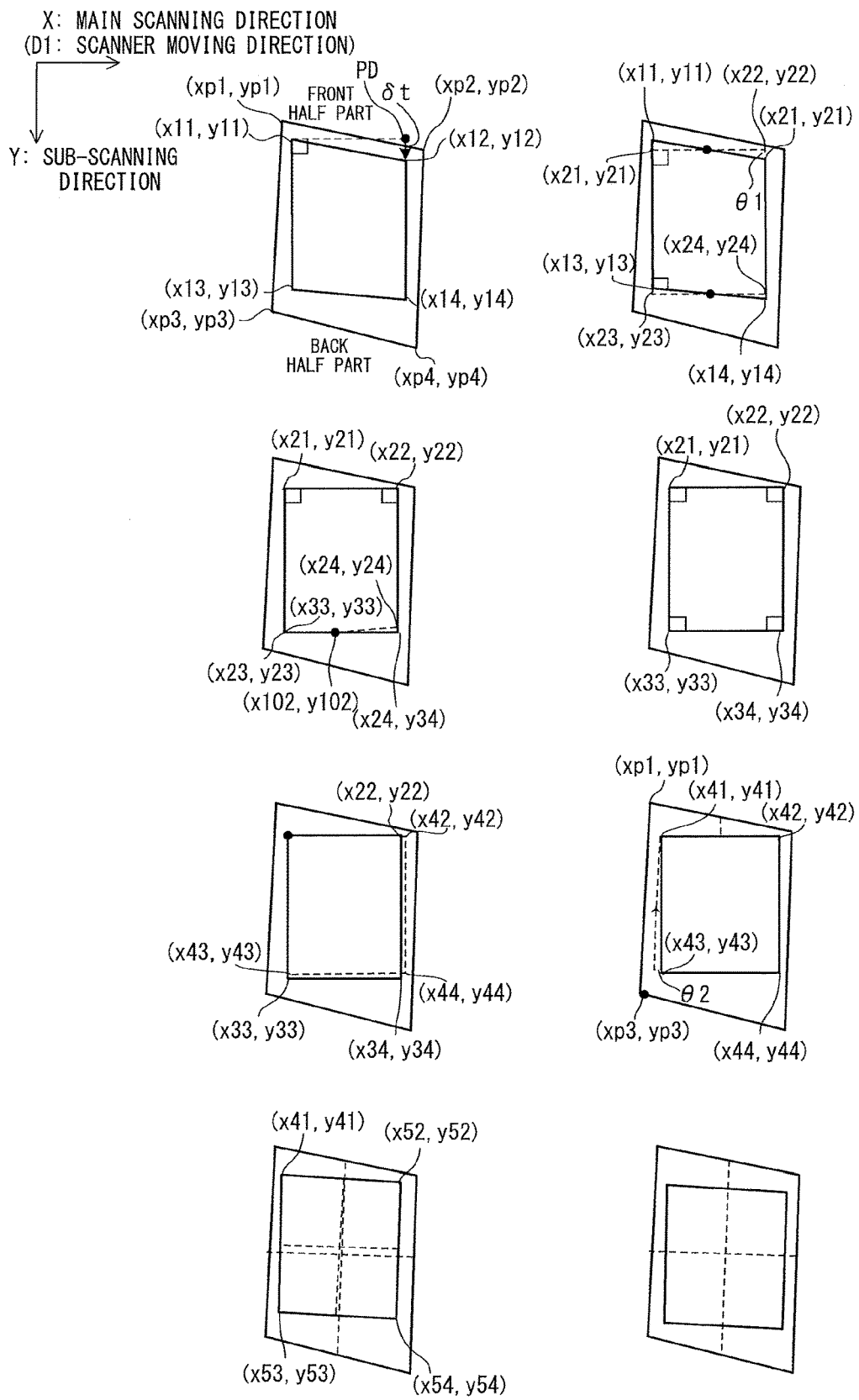
FIG. 11 is an explanatory diagram of image forming position correction processing.

FIG. 11 is a diagram explaining image forming position correction processing to the sheet.

The position calculation part 213 executes the edge detection on the image data (read image) obtained by the image scanner 100 by reading the measurement chart. Thereby, the position calculation part 213 obtains a position of the sheet end part and the respective positions of the measurement image 820. Here, a description with regard to the front surface 802 of the measurement chart is provided though, similar processing is applied to the back surface 803.

The position calculation part 213 connects the coordinates (xp1, yp1) of the upper left corner and the coordinates (xp2, yp2) of the upper right corner of the read image on the front surface of the measurement chart in a straight line. The position calculation part 213 connects the coordinates (xp1, yp1) of the upper left corner and the coordinates (xp3, yp3) of the lower left corner of the read image on the front surface of the measurement chart in a straight line. The position calculation part 213 connects the coordinates (xp2, yp2) of the upper right corner and the coordinates (xp4, yp4) of the lower right corner of the read image on the front surface of the measurement chart in a straight line. The position calculation part 213 connects the coordinates (xp3, yp3) of the lower left corner and the coordinates (xp4, yp4) of the lower right corner of the read image on the front surface of the measurement chart in a straight line.

The position calculation part 213 connects the coordinates (x11, y11) of the upper left corner of the measurement image formed at the upper left and the coordinates (x12, y12) of the upper right corner of the measurement image formed at the upper right of the read image on the front surface of the measurement chart in a straight line. The position calculation part 213 connects the coordinates (x11, y11) of the upper left corner of the measurement image formed at the upper left and the coordinates (x13, y13) of the lower left corner of the measurement image formed at the lower left of the read image on the front surface of the measurement chart in a straight line. The position calculation part 213 connects the coordinates (x13, y13) of the lower left corner of the measurement image formed at the lower left and the coordinates (x14, y14) of the lower right corner of the measurement image formed at the lower right of the read image on the front surface of the measurement chart in a straight line. The position calculation part 213 connects the coordinates (x12, y12) of the upper right corner of the measurement image formed at the upper right and the coordinates (x14, y14) of the lower right corner of the measurement image formed at the lower right of the read image on the front surface of the measurement chart in a straight line. It is noted that operation of the position calculation part 213 of connecting between the two coordinates in a straight line means obtaining an expression for a straight line which passes through two points.

The position calculation part 213 determines a transformation expression 1 for correcting the image data so that the straight line connecting the coordinates (x11, y11) and the coordinates (x12, y12) crosses at right angles with respect to the straight line connecting the coordinates (x11, y11) and the coordinates (x13, y13). At this time, a middle point of the straight line connecting the coordinates (x11, y11) and the coordinates (x12, y12) becomes a reference. The transformation expression 1 is a calculation expression for correcting a write start position (image forming position) in the sub-scanning direction of the image at the time of image formation at each position in the main scanning direction at the time of image formation. A squareness correction amount d which is a correction amount of the squareness deviation amount δ obtained by the transformation expression 1 corresponds to a correction condition of the squareness deviation amount.

The squareness correction amount d is obtained as follows. The position calculation part 213 obtains a right angle ideal point PD (xpd, ypd) from the coordinates (x11, y11), the coordinates (x12, y12), the coordinates (x13, y13), and the coordinates (x14, y14). For example, the position calculation part 213 determines a first straight line connecting the measurement image formed at the upper left and the measurement image formed at the lower left of the read image on the front surface of the measurement chart. The position calculation part 213 determines a second straight line which passes through the measurement image formed at the upper left of the read image on the front surface of the measurement chart and is orthogonal to the first straight line. The position calculation part 213 determines a third straight line connecting the measurement image formed at the lower right and the measurement image formed at the upper right of the read image on the front surface of the measurement chart. The position calculation part 213 defines an intersection point of the second straight line and the third straight line as the right angle ideal point PD. The position calculation part 213 obtains read squareness δt which is a linear distance from the right angle ideal point PD to the coordinates (x12, y12). The right angle ideal point PD (xpd, ypd) is represented as follows using an inclination a0 of the straight line connecting the coordinates (x11, y11) and the coordinates (x13, y13). It is noted that "b" is y intercept of a straight line with the inclination of −1/a0 and which passes through the coordinates (x11, y11).

$$xpd=x11+(x12-x11) \quad \text{(Expression 4)}$$

$$ypd=-xpd/a0+b \quad \text{(Expression 5)}$$

$$a0=(y11-y13)/(x11-x13) \quad \text{(Expression 6)}$$

As the read squareness δt is the distance from the right angle ideal point PD (xpd, ypd) to the coordinates (x12, y12), it is represented by the following expression.

$$δt=\text{sqrt}((x12-xpd)^2+(y12-ypd)^2) \quad \text{(Expression 7)}$$

Here, the function sqrt( ) is a function for obtaining a square root. The operation symbol "^" means power.

The read squareness δt is a value including the squareness deviation δ caused by the individual difference of the image scanner 100. For that reason, the position calculation part 213 obtains the squareness correction amount d by the following expression using the read squareness δt and the squareness deviation δ caused by the individual difference.

$$d=δt+δ \quad \text{(Expression 8)}$$

The squareness correction amount d, the read squareness δt, and the squareness deviation δ are index values indicating inclination of 1 mm respectively, which are stored in the individual information storage part 214 as parameters which simple addition is possible. It is noted that the squareness correction amount d may be stored in the sheet management table 400. The squareness correction amount d corresponds to a first right angle adjustment condition. The squareness deviation δ is a measurement error (read error) caused by the individual difference of the image scanner 100. The squareness correction amount d is a correction condition generated to reduce the measurement error (read error) from the measurement result (read image) of the measurement image obtained by the image scanner 100.

The X coordinates at the upper left corner of the read image are corrected by moving along a straight line (y=a0x+b0) connecting the coordinates (x11, y11) and the coordinates (x13, y13). The X coordinates at the upper right corner of the read image are corrected by moving along a straight line (y=a1x+b1) connecting the coordinates (x11, y11) and the coordinates (x12, y12). If an inclination a1 of the straight line connecting the coordinates (x11, y11) and the coordinates (x12, y12) is negative, the read error of the image scanner 100 is corrected to move the coordinates (x11, y11)

and the coordinates (x12, y12) to the coordinates (x21, y21) and the coordinates (x22, y22).

$$x21 = x11 - 0.5d*\cos(\theta 0) \quad \text{(Expression 9)}$$

$$y21 = y11 - 0.5d*\sin(\theta 0) \quad \text{(Expression 10)}$$

$$x22 = x12 + 0.5d*\cos(\theta 1) \quad \text{(Expression 11)}$$

$$y22 = y12 + 0.5d*\sin(\theta 1) \quad \text{(Expression 12)}$$

It is noted that "$\theta 1$" is arctan (a1).

If the inclination a1 of the straight line connecting the coordinates (x11, y11) and the coordinates (x12, y12) is positive, the position calculation part 213 obtains the coordinates (x21, y21) and the coordinates (x22, y22) based on the following expression. Thus, as for the coordinates (x11, y11) and the coordinates (x12, y12), the read error of the image scanner 100 is corrected.

$$x21 = x11 + 0.5d*\cos(\theta 0) \quad \text{(Expression 13)}$$

$$y21 = y11 + 0.5d*\sin(\theta 0) \quad \text{(Expression 14)}$$

$$x22 = x12 - 0.5d*\cos(\theta 1) \quad \text{(Expression 15)}$$

$$y22 = y12 - 0.5d*\sin(\theta 1) \quad \text{(Expression 16)}$$

Similarly, the coordinates (x13, y13) of the lower left corner of the read image and the coordinates (x14, y14) of the lower right corner of the read image are respectively corrected to the coordinates (x23, y23) and the coordinates (x24, y24) based on the squareness correction amount d. If the inclination a1 is negative, the following expressions are applied.

$$x23 = x13 - 0.5d*\cos(\theta 0) \quad \text{(Expression 17)}$$

$$y23 = y13 - 0.5d*\sin(\theta 0) \quad \text{(Expression 18)}$$

$$x24 = x14 + 0.5d*\cos(\theta 1) \quad \text{(Expression 19)}$$

$$y24 = y14 + 0.5d*\sin(\theta 1) \quad \text{(Expression 20)}$$

If the inclination a1 is positive, the following expressions are applied.

$$x23 = x13 + 0.5d*\cos(\theta 0) \quad \text{(Expression 21)}$$

$$y23 = y13 + 0.5d*\sin(\theta 0) \quad \text{(Expression 22)}$$

$$x24 = x14 - 0.5d*\cos(\theta 1) \quad \text{(Expression 23)}$$

$$y24 = y14 - 0.5d*\sin(\theta 1) \quad \text{(Expression 24)}$$

It is noted that a0=actan(a0), $\theta 0$=actan(a1).

In this way, an influence of a squareness deviation value δ unique to the image scanner 100 is reduced for both the read image of the front surface and the read image of the back surface. Further, as the image data is corrected based on the corrected read image using the squareness deviation value δ, the squareness of the image formed on the sheet by the image forming apparatus 10 becomes correct. It means that the squareness approaches "zero".

The (Expression 9) through the (Expression 24) are expressions for transforming the coordinates of the four corners of the read image but the expressions may be transformation expressions for any points (coordinates) in the read image. A description is provided with regard to the coordinates of an arbitrary point on the straight line (x1m, y1m) connecting the coordinates (x11, y11) and the coordinates (x12, y12) as an example. A movement direction of the arbitrary point by correction is the same as the movement direction of the coordinates (x11, y11) or the coordinates (x12, y12). The movement distance is proportional to a distance from the middle point of the coordinates (x11, y11) and the coordinates (x12, y12) to the coordinates (x1m, y1m). Thereby, new coordinates (x2m, y2m) obtained by correcting the coordinates (x1m, y1m) are represented by the following expressions.

If the inclination a1 is negative and the coordinates (x1m, y1m) are closer to the coordinates (x11, y11) than to the middle point, the new coordinates (x2m, y2m) are represented by the following expressions.

$$x2m = x1m - 0.5d*\alpha*\cos(\theta 0) \quad \text{(Expression 25)}$$

$$y2m = y1m - 0.5d*\alpha*\sin(\theta 0) \quad \text{(Expression 26)}$$

If the inclination a1 is negative and the coordinates (x1m, y1m) are closer to the coordinates (x12, y12) than to the middle point, the new coordinates (x2m, y2m) are represented by the following expressions.

$$x2m = x1m + 0.5d*\alpha*\cos(\theta 1) \quad \text{(Expression 27)}$$

$$y2m = y1m + 0.5d*\alpha*\sin(\theta 1) \quad \text{(Expression 28)}$$

If the inclination a1 is positive and the coordinates (x1m, y1m) are closer to the coordinates (x11, y11) than to the middle point, the new coordinates (x2m, y2m) are represented by the (Expression 27) and the (Expression 28). If the inclination a1 is positive and the coordinates (x1m, y1m) are closer to the coordinates (x12, y12) than to the middle point, the new coordinates (x2m, y2m) are represented by the (Expression 25) and the (Expression 26). In the above expressions from the (Expression 25) through the (Expression 28), a coefficient α is represented by the following expression.

$$\alpha = Lm/L3 \quad \text{(Expression 29)}$$

It is noted that "L3" is a distance from the middle point of the coordinates (x11, y11) and the coordinates (x12, y12) to the coordinates (x11, y11). "Lm" is a distance from the middle point of the coordinates (x11, y11) and the coordinates (x12, y12) to the coordinates (x1m, y1m).

The coordinates of an arbitrary point not on the straight line (x1n, y1n) connecting the coordinates (x11, y11) and the coordinates (x12, y12) is transformed into the coordinates (x2n, y2n) by correction. For example, by setting an intersection point of a straight line of the inclination a0 passing through the middle point of the coordinates (x11, y11) and the coordinates (x12, y12) and a straight line of the inclination a1 passing through the coordinates (x1n, y1n) as a reference and by correcting the coordinates (x1n, y1n) similarly to the coordinates (x1m, y1m), the coordinates (x2n, y2n) are obtained.

The position calculation part 213 determines a transformation expression 2 for correcting the image data so that a straight line connecting the coordinates (x23, y23) and the coordinates (x24, y24) crosses at right angles with respect to a straight line connecting the coordinates (x21, y21) and the coordinates (x23, y23). At this time, a position of a middle point of the straight line (x102, y102) connecting the coordinates (x23, y23) and the coordinates (x102, y102) becomes a reference. The transformation expression 2 is a calculation expression for correcting the magnification in the sub-scanning direction at the time of image formation at each position in the main scanning direction at the time of image formation. The transformation expression 2 corresponds to a second right angle adjustment condition. Based on the transformation expression 2, the position calculation part 213 corrects the coordinates (x23, y23) to the coordinates (x33, y33) and corrects the coordinates (x24, y24) to the coordinates (x34, y34).

The position calculation part 213 determines a transformation expression 3 for correcting the image data so that the image length in the main scanning direction and the image length in the sub-scanning direction at the time of image formation to be formed on the sheet become an ideal length. At this time, the upper left corner of the read image becomes a reference. The transformation expression 3 is a calculation expression for correcting the magnifications of the images in the main scanning direction and in the sub-scanning direction at the time of image formation. The transformation expression 3 corresponds to an expansion/contraction adjustment condition. Based on the expansion/contraction adjustment condition, the position calculation part 213 corrects the coordinates (x21, y21) to the coordinates (x41, y41). It is noted that in a case where the upper left corner of the read image becomes the reference, the value of the coordinates (x21, y21) is the same as the value of the coordinates (x41, y41). Based on the expansion/contraction adjustment condition, the position calculation part 213 corrects the coordinates (x22, y22) to the coordinates (x42, y42), corrects the coordinates (x33, y33) to the coordinates (x43, y43), and corrects the coordinates (x34, y34) to the coordinates (x44, y44).

The position calculation part 213 corrects the image data so that the left end part of the sheet becomes parallel to the left end part of the image to be formed. The left end part of the sheet is a line segment connecting the coordinates (xp1, yp1) of the upper left of the measurement chart and the coordinates (xp3, yp3) of the lower left of the measurement chart. The left end part of the image to be formed is a line segment connecting the coordinates (x41, y41) of the upper left corner of the image and the coordinates (x43, y43) of the lower left corner of the image.

The position calculation part 213 determines a transformation expression 4 for correcting the image data so that the image to be formed on the sheet rotates by an angle centering the upper left corner. The transformation expression 4 corresponds to a rotation adjustment condition. By correcting based on the rotation adjustment condition, the position calculation part 213 transforms the coordinates (x42, y42) to the coordinates (x52, y52), transforms the coordinates (x43, y43) to the coordinates (x53, y53), and transforms the coordinates (x44, y44) to (x54, y54).

When the center position of the sheet does not match the center position of the image to be formed, to match the two positions, the position calculation part 213 determines a transformation expression 5 for correcting the write start position in the main scanning direction and in the sub-scanning direction at the time of image formation. For example, the position calculation part 213 obtains the center position of the sheet from the coordinates (xp1, yp1) through the coordinates (xp4, yp4) of the four corners of the measurement chart. The transformation expression 5 corresponds to an offset condition. The forming position of the image on the sheet transformed based on the offset condition becomes an ideal forming position.

As described, the registration of the image forming position is adjusted by causing the image to be formed on the sheet itself to shift by a predetermined amount and to rotate based on the length from the sheet end part to the measurement image 820. In the manual mode, the position calculation part 213 determines the transformation expressions 1 through 5 based on the information on the front surface input from the operation part 20. In the automatic mode, the position calculation part 213 determines the transformation expressions 1 through 5 based on the read image of the front surface of the measurement chart obtained by the image scanner 100. The transformation expressions 1 through 5 for the front surface correspond to the adjustment conditions for the first surface of the sheet. The transformation expressions 1 through 5 for the front surface are stored in the sheet management table 400. It is noted that the transformation expressions 1 through 5 for the front surface may be unified into one transformation expression. As for the back surface of the sheet, the image forming position is corrected similarly to the front surface of the sheet. In the automatic mode, the position calculation part 213 determines the transformation expressions 1 through 5 for the back surface based on the read image of the back surface of the measurement chart obtained by the image scanner 100. The transformation expressions 1 to 5 for the back surface correspond to the adjustment condition for the second surface of the sheet. The transformation expressions 1 to 5 for the back surface are stored in the sheet management table 400. Further, at least one of the transformation expressions 1 through 5 may be determined as the adjustment condition.

If the image forming apparatus 10 forms the image on the sheet based on the image data, the position adjustment part 211 transforms the image data based on the transformation expressions 1 through 5 stored in the sheet management table 400. With this, the registration of the image forming position is corrected so that the image forming position with respect to the sheet becomes an ideal position.

(Adjustment Condition Generation Processing by Automatic Mode)

Figure 12:
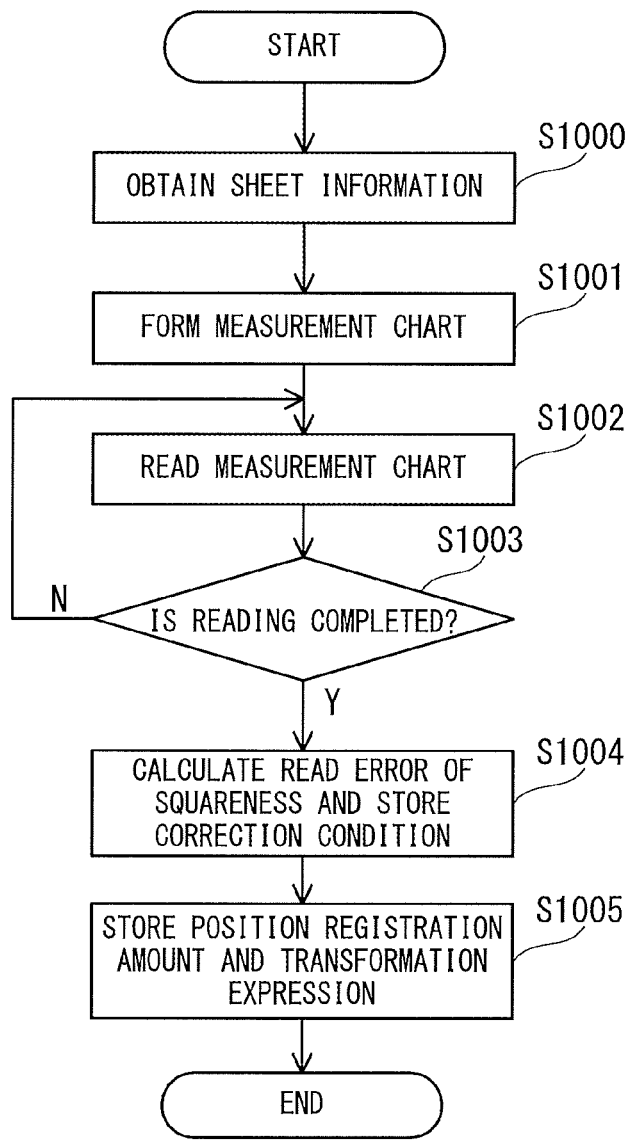
FIG. 12 is a flowchart representing adjustment condition generation processing in an automatic mode.

FIG. 12 is a flowchart representing adjustment condition generation processing by the automatic mode. When an automatic mode is selected through the selection screen 500 in FIG. 3 for selecting the adjustment condition generation mode and the instruction to select the automatic mode is obtained from the operation part 20, the controller 200 starts the adjustment condition generation processing.

The controller 200 having started the adjustment condition generation processing first obtains information identifying a type of the sheet from the operation part 20 (Step S1000). The controller 200 obtains the measurement image data for forming the measurement chart for generating the adjustment condition from the pattern generator 70 and causes the printer 150 to execute the image forming processing in accordance with the measurement image data. The measurement image in accordance with the measurement image data is formed on the sheet and the measurement chart is thus formed (Step S1001). The image forming apparatus 10 discharges the measurement chart formed.

The user places the measurement chart formed on the platen of the image scanner 100 and instructs to read the measurement chart through the operation part 20. Thus, the image scanner 100 reads the measurement chart and transmits the image data representing the read image to the controller 200. The measurement chart is read in this way (Step S1002).

The controller 200 determines whether the reading of the measurement chart is completed or not (Step S1003). For example, if a plurality of measurement charts is formed, the controller 200 determines whether the reading of the measurement chart is completed or not depending on whether the image data corresponding to the number of measurement charts is obtained from the image scanner 100. In case of the measurement chart having the measurement images formed on both sides of sheet, the controller 200 determines whether the reading of the measurement chart is completed or not depending on whether the image data which is twice as many as the number of output measurement chart is obtained. In a case where the measurement chart is read by dividing each surface into two parts of the controller 200 determines whether the reading of the measurement chart is completed or not depending on whether the image data which is four times as many as the number of output measurement chart is obtained.

If it is determined that the reading of the measurement chart is completed (Step S1003: Y), the controller 200 calculates the read error (measurement error) caused by the individual difference of the image scanner 100 based on the read image represented by the image data (read data) obtained. Here, the controller 200 calculates the squareness deviation δ. The controller 200 generates the correction condition to reduce the squareness deviation δ which is the calculated measurement error and stores the correction condition in the individual information storage part 214 (Step S1004). The controller 200 obtains the correction condition to reduce an angle of one corner of the front surface image 1402 and the back surface image 1404 of the read image (see FIG. 10). For example, by calculating two angle differences between the front surface image 1402 and the back surface image 1404, the controller 200 obtains the correction condition. Further, the controller 200 may obtain the correction condition by estimating the image before being influenced by the error by executing the reverse transformation of the measurement error to the front surface image 1402 and the back surface image 1404 and by calculating the measurement error which minimizes the angle θA and the angle θA' (see FIG. 10).

The controller 200 obtains the position registration amount of the image at the time of image formation on the sheet based on the read image of the measurement chart and the correction condition obtained. Further, the controller 200 obtains the transformation expressions as described above. The controller 200 stores the position registration amount and the transformation expressions obtained in the sheet management table 400 corresponding to the sheet obtained through the processing Step S1000 as the adjustment condition (Step S1005).

Figure 13:
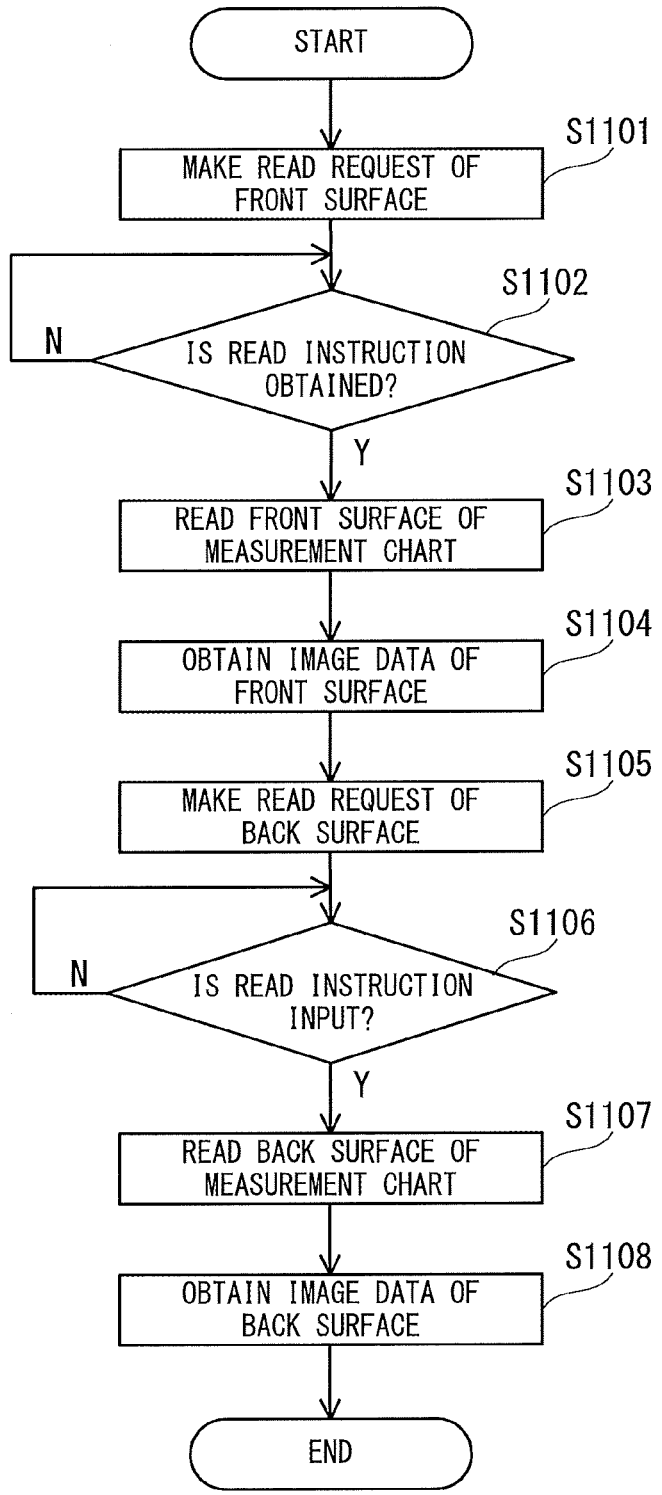
FIG. 13 is a flow chart representing reading processing of the measurement chart.

FIG. 13 is a flowchart representing processing to read the measurement chart of the step S1002.

After discharging the measurement chart, the controller 200 makes a read request of the front surface of the measurement chart to the user (Step S1101). For example, the controller 200 makes the read request by displaying guidance for executing the read operation of the front surface on the operation part 20. After making the read request, the controller 200 waits until it obtains a read instruction (Step S1102). In accordance with the guidance, the user places the measurement chart on the platen of the image scanner 100 so that the front surface is read and instructs to read the measurement chart through the operation part 20.

When the read instruction of the measurement chart is obtained from the operation part 20 (Step S1102: Y), the controller 200 controls the operation of the image scanner 100 to read the front surface of the measurement chart (Step S1103). The controller 200 obtains the image data representing the read image of the front surface of the measurement chart from the image scanner 100 (Step S1104). It is noted that the coordinates of the four corners of the measurement chart shown in FIG. 5, i.e., the coordinates (X01, Y01), (X11, Y11), (X21, Y21), (X31, Y31) may be included in the image data. The coordinates of the four corners of the measurement chart become necessary when obtaining the left side or the center position of the measurement chart.

When reading of the front surface is completed by obtaining the image data representing the read image of the front surface, the controller 200 makes a read request of the back surface of the measurement chart to the user (Step S1105). For example, the controller 200 makes the read request by displaying the guidance for executing the read operation of the back surface on the operation part 20. After making the read request, the controller 200 waits until it obtains the read instruction (Step S1106). In accordance with the guidance, the user places the measurement chart on the platen of the image scanner 100 so that the back surface is read and instructs to read the measurement chart through the operation part 20.

When the read instruction of the measurement chart is obtained from the operation part 20 (Step S1106: Y), the controller 200 controls the operation of the image scanner 100 to read the back surface of the measurement chart (Step S1107). The controller 200 obtains the image data representing the read image of the back surface of the measurement chart from the image scanner 100 (Step S1108). The image data of the back surface 803 includes the same contents as the image data of the front surface 802 (coordinates of the four corners and the like).

With the processing as described above, the controller 200 obtains the image data of both sides of the measurement chart and executes subsequent processing (processing after the step S1004).

(Image Forming Processing)

Figure 14:
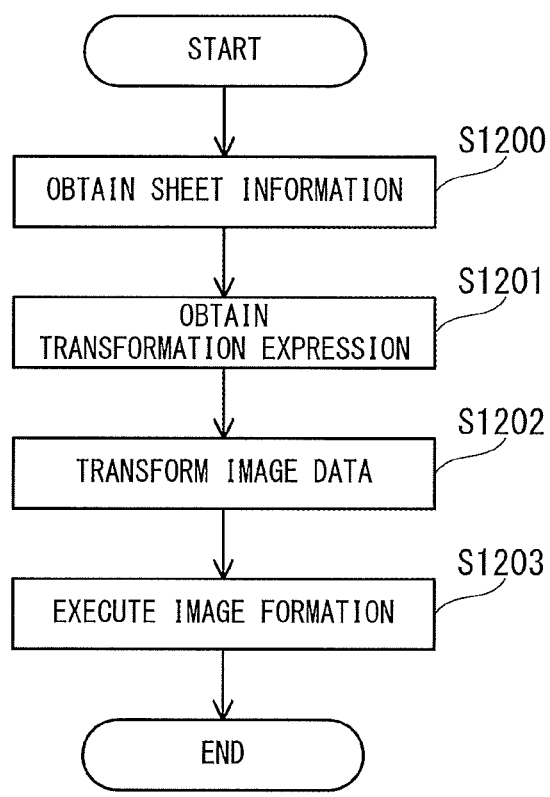
FIG. 14 is a flowchart representing processing at the time of image formation.

FIG. 14 is a flowchart representing processing at the time of normal image formation. In the processing, correction of the image forming position is executed. It is noted that, in the present embodiment, the processing at the time of normal image formation includes copying processing through which image formation is executed on the sheet based on the image data of an original image read by the image scanner 100 or processing in accordance with a print job from an external information processing device executed by the image forming apparatus 10.

The controller 200 obtains sheet information on the sheet used for the image formation by an image forming instruction (Step S1200). The sheet information includes information such as the type of the sheet used for the image formation. The controller 200 can specify the type of the sheet used for the image formation by the sheet information.

The controller 200 obtains the transformation expression which is the adjustment condition in accordance with the type of the sheet specified by the sheet information from the sheet management table 400 (Step S1201). As described, the transformation expression is the expression used to suppress the position registration amount of the image forming position generated by the measurement chart. In the present embodiment, as the transformation expression is obtained by correcting the read image of the measurement chart based on the squareness correction amount d, accuracy of the transformation expressions is improved.

The controller 200 transforms the image data representing the image to be formed (Step S1202). The controller 200 obtains the image data to be transformed from the image scanner 100. The controller 200 sets the transformation expression in the position adjustment part 211 of the image processing part 210 and causes the position adjustment part 211 to transform the image data. By applying the transformation expression, the position adjustment part 211 deforms a shape of the image which the image data represents in advance. With this deformation, the deformation which occurs in the printer 150 is cancelled.

The controller 200 controls the printer 150 to cause to execute the image formation by the transformed image data (Step S1203). Thereby, an image in accordance with the transformed image data is formed on the sheet.

It is noted that if a double-side printing is instructed, the controller 200 controls the printer 150 to cause the sheet having the image formed on the front surface to be conveyed to the reverse path 113 to reverse the front and back of the sheet. By executing the similar processing to the steps S1201 and S1202, the controller 200 executes the transformation of the image data for the back surface based on the transformation expression for the back surface. The controller 200 causes the printer 150 to execute the image formation on the back surface of the sheet by the image data for the back surface after the transformation. Thereby, the image is formed at ideal positions on both sides of the sheet.

The image forming apparatus 10 of the present embodiment having the configuration as above is capable of forming an image with reduced read error of the measurement chart caused by the squareness deviation δ unique to the image scanner 100. That is, it becomes possible to accurately measure the read squareness δt of the measurement chart caused by the image forming processing of the printer 150. As a result, it becomes possible to generate the transformation expression for accurately correcting the image forming position. For example, the image forming apparatus 10 separately generates transformation expressions for the front surface and the back surface of the sheet. Using the transformation expressions, the image forming apparatus 10 corrects the image data and executes the double-side printing. Thus, the image forming position of the front surface and the image forming position of the back surface are accurately corrected. Also, the squareness of the image is correctly corrected. It means that the squareness of the front surface and the squareness of the back surface can be brought close to "0".

It is noted that the image forming apparatus 10 may comprise an external reading apparatus connected thereto instead of the image scanner 100. In this case, the controller 200 obtains the correction condition (squareness correction amount d) based on the individual difference information (squareness deviation δ) and the read image (read squareness δt) of the measurement chart obtained by the reading apparatus.

Besides the image scanner 100, the image forming apparatus 10 may incorporate a reading apparatus for reading the measurement chart on a sheet conveyance path. In this case, the user's work of placing the measurement chart on the platen of the image scanner 100 to cause the image scanner 100 to read the measurement chart is omitted. Instead, the measurement chart is read automatically. Thereby, usability improves. The reading apparatus is arranged on a downstream side of the fixing device 107 in the sheet conveyance path. For example, the reading apparatus is arranged on a conveyance path between the fixing device 107 and the discharge roller 112, and on the reverse path 113.

If the reading apparatus is arranged on the reverse path 113, the controller 200 causes to convey the measurement chart having the measurement image formed on the front surface to the reverse path 113 to cause the reading apparatus to read the front surface of the measurement chart. Thereafter, the controller 200 causes to reverse the front and back surface of the measurement chart and causes to convey the measurement chart to the second transfer part 106. Thereby, the measurement image is formed on the back surface of the measurement chart. The controller 200 again causes to convey the measurement chart having the measurement image formed on the back surface to the reverse path 113 to cause the reading apparatus to read the back surface of the measurement chart. After the back surface of the measurement chart is read by the reading apparatus, the controller 200 causes to discharge the measurement chart by the discharge roller 112 via the secondary transfer part 106 and the fixing device 107.

Similar to a case where the measurement chart is read by the image scanner 100, the controller 200 obtains the correction condition (squareness correction amount d) based on the read image of the measurement chart (read squareness δt) by the reading apparatus and the individual difference information (squareness deviation δ).

According to the embodiment as described, the measurement error (squareness deviation δ) of the read image caused by the individual difference of the image scanner 100 is obtained from the read image of the measurement chart by the position calculation part 213 and is stored in the individual information storage part 214.

The squareness correction amount d is obtained by adding the squareness deviation δ caused by the individual difference of the image scanner 100 to the squareness deviation δ caused by the printer 150. Thus, the squareness correction amount d is an example of the correction condition generated to reduce the measurement error (read error) from the read image of the measurement chart obtained by the image scanner 100. By applying the correction condition to the read image of the measurement chart obtained by the image scanner 100, the position calculation part 213 reduces the measurement error (read error) caused by the individual difference of the image scanner 100 included in the read image. The position calculation part 213 generates the correction condition (position registration amount, transformation expression) in accordance with the read image having the measurement error reduced. The position adjustment part 211 corrects the image forming position on the sheet in accordance with the adjustment condition. As the influence of the individual difference which is present in the image scanner 100 on the read image of the measurement chart on which the measurement image as the reference image is formed is reduced, the correction accuracy of the image forming position improves.

The image forming apparatus 10 of the present embodiment is capable of correcting the image forming position on both sides of the sheet. The image scanner 100 reads the measurement image formed on the front surface (first surface) of the sheet and reads the measurement image formed on the back surface (second surface) of the sheet. By applying the correction condition to the read image of the measurement image formed on the first surface, the position calculation part 213, reduces the read error (measurement error) caused by the individual difference of the image scanner 100 from the read image. The position calculation part 213 generates a first adjustment condition for correcting the image forming position on the first surface in accordance with the read image having the measurement error reduced.

Similarly, by applying the correction condition to the read image of the measurement image formed on the second surface, the position calculation part 213 reduces the read error caused by the individual difference of the image scanner 100 included in the read image. The position calculation part 213 generates a second adjustment condition for correcting the image forming position on the second surface in accordance with the read image having the read error reduced.

The position adjustment part 211 corrects the image forming position at the time of image formation on the first surface of the sheet in accordance with the first adjustment condition. The position adjustment part 211 corrects the image forming position at the time of image formation on the second surface of the sheet in accordance with the second adjustment condition. Thereby, the image forming position is accurately corrected and the image is formed on both sides of the sheet.

As described in FIG. 8, the image scanner 100 reads the measurement chart by dividing into two parts of the first half part and the second half part. Then, by combining the read images, an entire read image of one surface of the measurement chart can be obtained. In this case, edge detection accuracy of the sheet end part of the measurement chart improves, which improves the correction accuracy of the image forming position.

The position calculation part 213 generates the adjustment condition by one of the adjustment condition generation modes of the manual mode and the automatic mode. In the automatic mode, since it is unnecessary for the user to measure the position of the measurement image from the measurement chart, usability improves. In the manual mode, since the reading apparatus such as the image scanner 100 and the like is not required, it becomes unnecessary to consider the influence of the individual difference of the image scanner 100.

As shown in FIG. 5, the measurement chart is formed by forming the measurement image on the sheet. As shown in FIG. 11, the position calculation part 213 generates the adjustment condition based on the position of the measurement image formed on the measurement chart.

The position calculation part 213 determines a first straight line connecting the measurement image formed at the upper left corner and the measurement image formed at the lower left corner of the read image of the measurement chart. The position calculation part 213 determines a second straight line which passes through the measurement image formed at the upper left corner of the read image of the measurement chart and is orthogonal to the first straight line. The position calculation part 213 determines a third straight line connecting the measurement image formed at the lower right corner and the measurement image formed at the upper right corner of the read image of the measurement chart. The position calculation part 213 determines the intersection point of the second straight line and the third straight line as the right angle ideal point PD.

The position calculation part 213 determines a distance from the right angle ideal point PD to the measurement image formed at the upper right corner of the measurement chart as the squareness deviation δt caused by the printer 150. By adding the squareness deviation δ which is the read error caused by the individual difference of the image scanner 100 to the squareness deviation δt, the position calculation part 213 determines the squareness correction amount d. The position calculation part 213 generates the adjustment condition using the squareness correction amount d.

(Correction of Trapezoidal Distortion)

The reading part 40 of the image scanner 100 reads the measurement chart while moving on the scan rail from the home position P1 to the end position P2. For example, two scan rails are provided in the sub-scanning direction at the time of image reading which is orthogonal to the moving direction of the reading part 40 (arrow D1 direction in FIG. 1). Due to the influence such as the individual difference of the two scan rails and the like, difference sometimes occurs in the moving speed of the reading part 40. It means that the moving speed of the reading part 40 of one end part is different from the other end part in the sub-scanning direction at the time of image reading. If the reading part reads the measurement chart with the speed difference, distortion occurs in the read image. This becomes trapezoidal distortion. The trapezoidal distortion is the read error which is unique to the image scanner 100. The trapezoidal distortion is one of the correction conditions which is obtained from the read image of the measurement chart by the position calculation part 213 and is stored in the individual information storage part 214.

Figure 15:
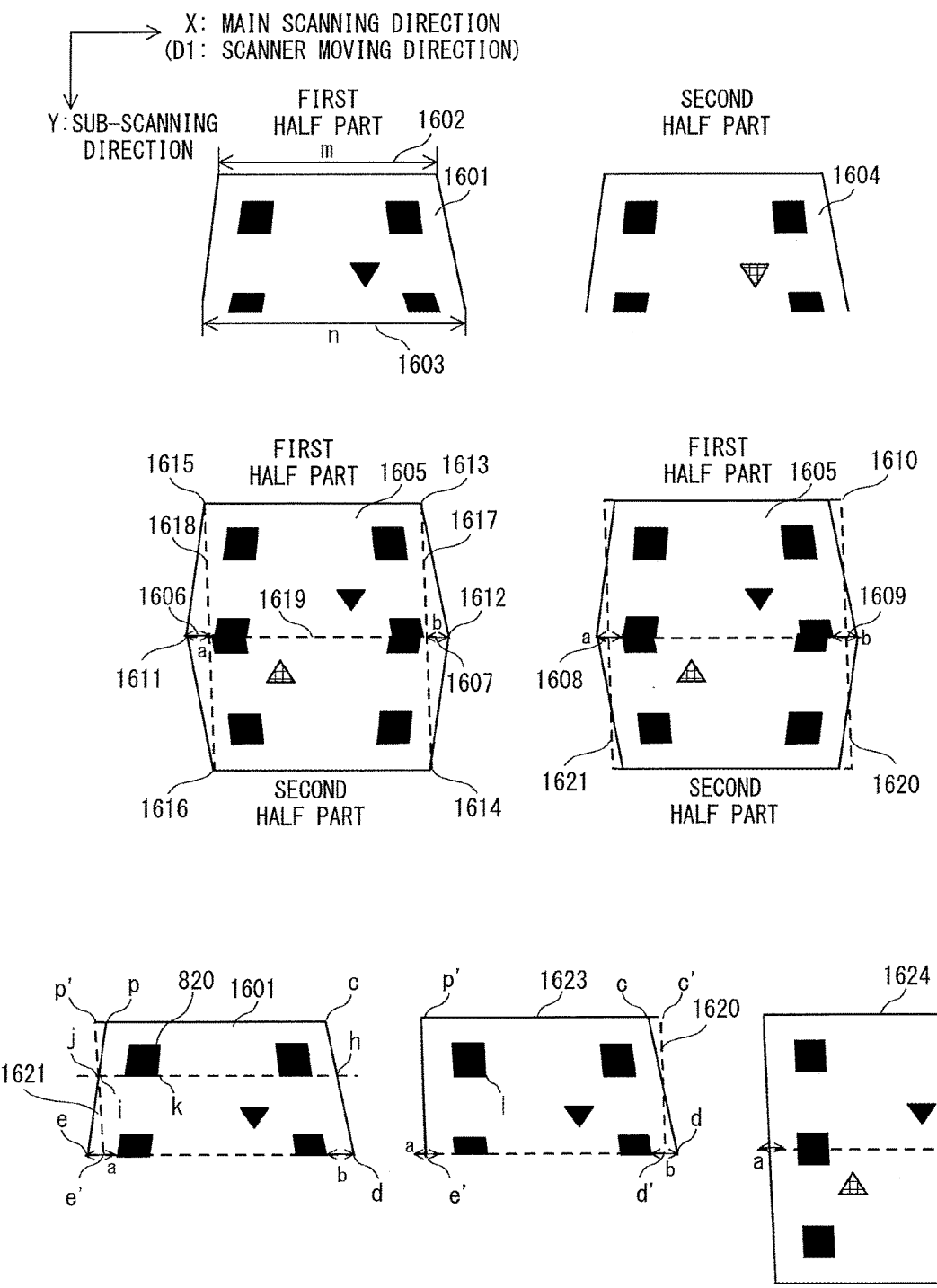
FIG. 15 is an explanatory diagram of the trapezoidal distortion.

FIG. 15 is an explanatory diagram of the trapezoidal distortion. The measurement chart shown in FIG. 5 is read by the reading part 40 by dividing into two parts of the first half part and the second half part. After the first half part of the measurement chart is read on the platen, the measurement chart is rotated by 180° and placed again on the platen. Then, the second half part of the measurement chart is read. Due to the speed difference in the sub-scanning direction of the reading part 40, depending on the position in the sub-scanning direction at the time of image reading, difference occurs in the length in the main scanning direction at the time of image reading in the read image 1601 of the first half part and the read image 1604 of the second half part of the front surface 802. For example, in the read image 1601, a length m of a first position side 1602 in the sub-scanning direction at the time of image reading is shorter than a length n of a second position side 1603 in the sub-scanning direction at the time of image reading. The same applies to the read image 1604. The difference between the length m and the length n becomes the read error caused by the trapezoidal distortion.

When correcting the read error caused by the trapezoidal distortion, the position calculation part 213 combines the read image 1601 and the read image 1604 to generate an entire read image 1605 of one surface of the measurement chart. To generate the entire read image 1605, the read image 1604 is rotated by 180° when combining the read images. Due to the arrangement of the measurement chart at the time of reading and the read error, there is a case where joining points 1611 and 1612 do not coincide with the read image 1601 of the first half part and the read image 1604 of the second half part. In this case, the position calculation part 213 defines the middle of the corresponding parts of each of the read images 1601 and 1604 as the joining points 1611 and 1612.

The position calculation part 213 connects the upper right corner 1613 and the lower right corner 1614 of the entire read image 1605 by a straight line 1617, connects the upper left corner 1615 and the lower left corner 1616 of the entire read image 1605 by a straight line 1618, and connects the joining point 1611 and the joining point 1612 of the entire read image 1605 by a straight line 1619. A straight line 1606 from the intersection point of the straight line 1618 and the straight line 1619 to the joining point 1611 of the left side is a length a, in which an intermediate point 1608 is included. A straight line 1607 from the intersection point of the straight line 1617 and the straight line 1619 to the joining point 1612 of the right side is a length b, in which an intermediate point 1609 is included. The position calculation part 213 generates a straight line 1620 obtained by moving the straight line 1617 in parallel to the intermediate point 1609. Also, the position calculation part 213 generates a straight line 1621 obtained by moving the straight line 1618 in parallel to the intermediate point 1608. The position calculation part 213 forms a rectangle 1610 by the straight lines 1620 and 1621.

The correction of the trapezoidal distortion is executed by correcting the entire read image 1605 to the rectangle 1610. A condition for correcting the entire read image 1605 to the rectangle 1610 becomes a correction condition. Processing to correct the entire read image 1605 to the rectangle 1610 by the correction condition or trapezoidal distortion correction processing is described. Here, description is provided with regard to the read image 1601 of the first half part as an example.

Four corners of the read image 1601 of the first half part are defined as vertexes c, d, e, and p. In the correction, a coordinate transformation is executed so that the vertexes p and e move to points p' and e' of the straight line 1621. Setting the vertex e as the origin and setting Y coordinates (coordinates in the sub-scanning direction) of the vertex d as "0", the position (coordinates) of the point e' is calculated by the following expression.

$$e'(x)=a/2 \quad \text{(Expression 30)}$$

$$e'(y)=0 \quad \text{(Expression 31)}$$

The position (coordinates) of the point p' is calculated by the following expression.

$$p'(x)=p(x)-a/2 \quad \text{(Expression 32)}$$

$$p'(y)=p(y) \quad \text{(Expression 33)}$$

The positions in the sub-scanning direction at the time of image reading of a point j on the straight line 1621, a point i on a line connecting the vertex p and the vertex e, and a point h on a line connecting the vertex c and the vertex d are the same as the coordinates K of a corner of the read image of the measurement image 820. Here, a distance from the point h to a point k is defined as a distance hk. A distance from the point h to the point j is defined as a distance hj. A distance from the point h to the point i is defined as a distance hi. Then, the coordinates l obtained by correcting the coordinates k is calculated by the following expression.

$$l(x)=h(x)-hk*hj/hi \quad \text{(Expression 34)}$$

$$l(y)=k(y) \quad \text{(Expression 35)}$$

A read image 1623 is an image obtained by correcting the vertexes p and e of the read image 1601 of the first half part. The coordinate transformation is executed to the read image 1623 so that the vertexes c and d move to points c' and d' of the straight line 1620. In this case, with a straight line connecting the points p' and e' as a starting point, the coordinate transformation is executed by the similar processing executed to the vertexes p and e.

By executing the similar processing to the read image 1604 of the second half part, the trapezoidal distortion correction processing ends. A read image 1624 shows a state in which the trapezoidal distortion correction processing ends. It is noted that in addition to using the entire read image 1605 itself, the trapezoidal distortion correction processing may be executed by using only the position (coordinates) of each point of the read image 1605.

Figure 16:
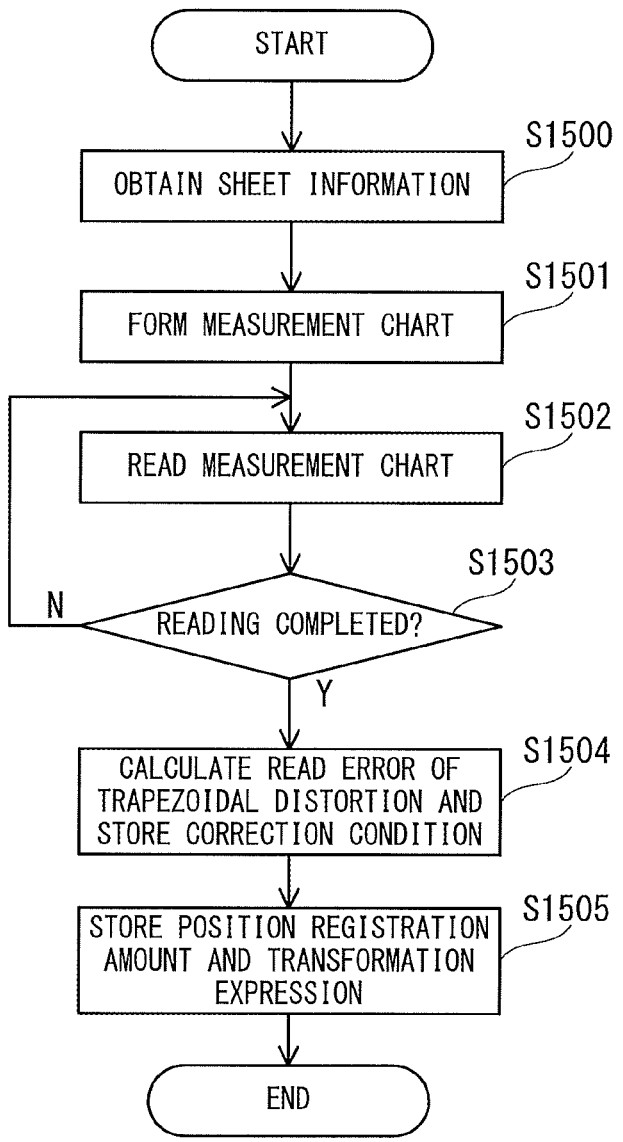
FIG. 16 is a flowchart representing adjustment condition generation processing when correcting the trapezoidal distortion.

FIG. 16 is a flowchart representing adjustment condition generation processing in the automatic mode when correcting the trapezoidal distortion. When the automatic mode is selected through the selection screen 500 in FIG. 3 for selecting the adjustment condition generation mode and the instruction to select the automatic mode is obtained from the operation part 20, the controller 200 starts the adjustment condition generation processing.

The controller 200 having started the adjustment condition generation processing first obtains information identifying a type of the sheet from the operation part 20 (Step S1500). The controller 200 obtains the measurement image data for forming the measurement chart for generating the adjustment condition from the pattern generator 70 and causes the printer 150 to execute the image forming processing in accordance with the measurement image data. The measurement image in accordance with the measurement image data is formed on the sheet and the measurement chart is thus formed (Step S1501). The image forming apparatus 10 discharges the measurement chart formed.

The user places the measurement chart formed on the platen of the image scanner 100 and instructs to read the measurement chart through the operation part 20. Thus, the image scanner 100 reads the measurement chart and transmits the image data (read data) representing the read image to the controller 200. The measurement chart is read in this way (Step S1502). The image scanner 100 reads one surface (front surface) of the measurement chart by dividing into two parts of the first half part and the second half part. After reading an area of a half or more of the first half part of the front surface of the measurement chart, the image scanner 100 instructs to rotate the measurement chart by 180° through the operation part 20. In response to the instruction, the user rotates the measurement chart by 180°, places the measurement chart on the platen of the image scanner 100, and instructs to read the measurement chart through the operation part 20. The image scanner 100 reads an area of the second half part of the front surface of the measurement chart which is rotated by 180°.

The controller 200 determines whether the reading of the measurement chart is completed or not (Step S1503). For example, if a plurality of measurement charts is formed, the controller 200 determines whether the reading of the measurement chart is completed or not depending on whether the image data which is twice as many as the number of measurement charts is obtained from the image scanner 100. In case of the measurement chart having the measurement images formed on both sides of sheet, the controller 200 determines whether the reading of the measurement chart is completed or not depending on whether the image data which is four times as many as the number of output measurement charts is obtained.

If it is determined that the reading of the measurement chart is completed (Step S1503: Y), the controller 200 calculates the read error (measurement error) caused by the trapezoidal distortion based on the read image represented by the image data obtained and generates the correction condition for reducing the read error. The controller 200 stores the generated correction condition in the individual information storage part 214 (Step S1504). Details of how to calculate the read error and the correction condition generation processing are described as above. That is, the controller 200 causes the position calculation part 213 to combine the read image 1601 of the first half part and the read image 1604 of the second half part, to generate the entire read image 1605 of the measurement chart, and to calculate the read error caused by the trapezoidal distortion using the read image 1605. The position calculation part 213 calculates the correction condition to bring the angles of the joining points 1611 and 1612 of the entire read image 1605 closer to 180°.

For example, the position calculation part 213 generates the straight line 1620 obtained by moving the straight line 1617 in parallel to the intermediate point 1609 from the intersection point of the straight line 1617 and the straight line 1619 to the joining point 1612 of the right side. The position calculation part 213 generates the straight line 1621 obtained by moving the straight line 1618 in parallel to the intermediate point 1608 from the intersection point of the straight line 1618 and the straight line 1619 to the joining point 1611 of the left side. The position calculation part 213 calculates the correction condition for correcting the entire read image 1605 to the rectangle 1610 formed by the straight line 1620 and the straight line 1621.

Based on the read image of the measurement chart and the correction condition obtained, the controller 200 obtains the position registration amount of the image at the time of image formation on the sheet. Further, the controller 200 obtains the transformation expressions as described. The controller 200 stores the position registration amount and the transformation expression obtained in the sheet management table 400 corresponding to the sheet obtained through the processing of the step S1500 as the adjustment condition (Step S1505).

The image forming apparatus 10 of the present embodiment as described appropriately obtains the read error unique to the image scanner 100 from the measurement chart and generates the correction condition in accordance with the read error and the adjustment condition at the time of image formation. Thereby, the image forming apparatus 10 of the present embodiment is capable of suppressing the influence of the read error unique to the image scanner 100 to correct the image forming position with high accuracy. Consequently, the accuracy of the image forming position at the time of image formation improves.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions. Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s). The computer may comprise one or more processors (e.g., central processing unit (CPU), micro processing unit (MPU)) and may include a network of separate computers or separate processors to read out and execute the computer executable instructions.

This application claims the benefit of Japanese Patent Application No. 2017-068812, filed Mar. 30, 2017 which is hereby incorporated by reference herein in its entirety.

What is claimed is:

1. An image forming apparatus comprising:
a reading unit, which comprises a carriage including a sensor and a platen for placing an original thereon, configured to read an original placed on the platen using the sensor while moving the carriage in a predetermined direction;
an image forming unit configured to form an image on a sheet based on a read result of the original obtained by the reading unit; and
a controller configured to:
control the image forming unit to form a plurality of measurement images corresponding to four corners of the sheet on a predetermined surface of the sheet, wherein the plurality of measurement images includes a first measurement image, a second measurement image, a third measurement image, and a fourth measurement image,
control the reading unit to read a first area on the predetermined surface of the sheet, wherein the first area includes an area in which the first measurement image is formed and an area in which the second measurement image is formed,
control the reading unit to read a second area on the predetermined surface of the sheet, wherein the second area includes an area in which the third measurement image is formed and an area in which the fourth measurement image is formed,
generate a read image relating to the predetermined surface of the sheet based on first read data relating to the first area read by the reading unit and second read data relating to the second area read by the reading unit,
obtain position information of the plurality of measurement images based on the read image,
adjust the position information of the plurality of measurement images based on a shape of the read image, and
control a position of an image to be formed on the predetermined surface of the sheet by the image forming unit based on the adjusted position information of the plurality of measurement images.

2. The image forming apparatus according to claim 1, wherein the controller is further configured to adjust the position information of the plurality of measurement images so that a shape of the read image becomes rectangular.

3. The image forming apparatus according to claim 1, wherein a shape of the plurality of measurement images is a rectangle.

4. The image forming apparatus according to claim 1, wherein a color of the plurality of measurement images is black.

5. The image forming apparatus according to claim 1, wherein the controller is configured to control the image forming unit to form a mark on a predetermined surface of the sheet,
wherein the first area includes the area in which the first measurement image is formed, the area in which the second measurement image is formed, and an area in which the mark is formed,
wherein the second area includes the area in which the third measurement image is formed, the area in which the fourth measurement image is formed, and the area in which the mark is formed, and
wherein the controller is configured to generate the read image from the first read data and the second read data based on read data relating to the mark of the first read data and read data relating to the mark of the second read data.

6. The image forming apparatus according to claim 5, wherein the mark includes a first mark formed between the first measurement image and the third measurement image and a second mark formed between the second measurement image and the fourth measurement image.

7. The image forming apparatus according to claim 6, wherein a shape of the first mark is a rectangle, and wherein a shape of the second mark is a rectangle.

8. The image forming apparatus according to claim 5, wherein a color of the mark is black.

9. The image forming apparatus according to claim 1, wherein the reading unit comprises a rail, and wherein the carriage moves on the rail.

10. The image forming apparatus according to claim 1, wherein the controller configured to:
- control the image forming unit to form a plurality of measurement images corresponding to four corners of the sheet on other sheet which is different from the predetermined surface of the sheet, wherein the plurality of measurement images includes a fifth measurement image, a sixth measurement image, a seventh measurement image, and an eighth measurement image,
- control the reading unit to read a third area on the other surface of the sheet, wherein the third area includes an area in which the fifth measurement image is formed and an area in which the sixth measurement image is formed,
- control the reading unit to read a fourth area on the other surface of the sheet, wherein the fourth area includes an area in which the seventh measurement image is formed and an area in which the eighth measurement image is formed,
- generate other read image relating to the other surface of the sheet based on third read data relating to the third area read by the reading unit and fourth read data relating to the fourth area read by the reading unit,
- obtain position information of the plurality of measurement images formed on the other surface of the sheet based on the other read image,
- adjust the position information of the plurality of measurement images formed on the other surface of the sheet based on a shape of the other read image, and
- control a position of an image to be formed on the other surface of the sheet by the image forming unit based on the adjusted position information of the plurality of measurement images formed on the other surface of the sheet.

11. A control method of an image forming apparatus comprising a reading unit comprising a carriage including a sensor and a platen for placing an original thereon and configured to read an original placed on the platen using the sensor while moving the carriage in a predetermined direction; comprising:
- forming a plurality of measurement images corresponding to four corners of the sheet on a predetermined surface of the sheet, wherein the plurality of measurement images includes a first measurement image, a second measurement image, a third measurement image, and a fourth measurement image,
- reading, by the reading unit, first read data relating to a first area on the predetermined surface of the sheet, wherein the first area includes an area in which the first measurement image is formed and an area in which the second measurement image is formed,
- reading, by the reading unit, second read data regarding a second area on the predetermined surface of the sheet, wherein the second area includes an area in which the third measurement image is formed and an area in which the fourth measurement image is formed,
- generating a read image relating to the predetermined surface of the sheet based on the first read data and the second read data,
- obtaining position information of the plurality of measurement images based on the read image,
- adjusting the position information of the plurality of measurement images based on a shape of the read image, and
- generating an adjustment condition for adjusting a position of an image to be formed on the predetermined surface of the sheet based on the adjusted position information of the plurality of measurement images.

* * * * *